US012679251B2

(12) United States Patent
Maloney et al.

(10) Patent No.: US 12,679,251 B2
(45) Date of Patent: Jul. 14, 2026

(54) VEHICLE HAVING RECONFIGURED PASSENGER COMPARTMENT MODES

(71) Applicant: Ford Global Technologies, LLC, Dearborn, MI (US)

(72) Inventors: Patrick Maloney, Livonia, MI (US); Marcos Silva Kondrad, Macomb Township, MI (US); Kevin Wayne Preuss, Ortonville, MI (US); Kevin VanNieulande, Fraser, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 202 days.

(21) Appl. No.: 18/406,328

(22) Filed: Jan. 8, 2024

(65) Prior Publication Data

US 2025/0222835 A1 Jul. 10, 2025

(51) Int. Cl.
*B60N 2/06* (2006.01)
*B60N 2/01* (2006.01)
(Continued)

(52) U.S. Cl.
CPC ................ *B60N 2/06* (2013.01); *B60N 2/01* (2013.01); *B60N 2/02246* (2023.08);
(Continued)

(58) Field of Classification Search
CPC ........ B60N 2/06; B60N 2/01; B60N 2/02246; B60N 2/0226; B60N 2/0233;
(Continued)

(56) References Cited

U.S. PATENT DOCUMENTS

| | | | |
|---|---|---|---|
| 6,135,529 A | 10/2000 | De Angelis et al. | |
| 2009/0160229 A1* | 6/2009 | Mabuchi .................. | B60N 2/01 297/217.3 |

(Continued)

OTHER PUBLICATIONS

Automotive Territory DailyNews, Aug. 23, 2023 (YouTube video—https://www.youtube.com/watch?v=BKASYGwPHgk) (hereinafter referred to as Automotive News). https://www.youtube.com/watch?v=BkASYGwPHgk (Year: 2023).*

*Primary Examiner* — Abby Lin
*Assistant Examiner* — Renee LaRose
(74) *Attorney, Agent, or Firm* — Vichit Chea; Price Heneveld LLP

(57) ABSTRACT

A motor vehicle having a passenger compartment with a forward region, a central region, and a rearward region, a floor, a seating rail system positioned on the floor and extending along a longitudinal direction of the vehicle, a plurality of seating assemblies arranged in the passenger compartment in a first row, a second row, and a third row. Each seating assembly has a seat base coupled to the seating rail system, a seat movably coupled to the seat base, a seat back movably coupled to the seat base, and seat actuators configured to activate the seating assemblies. The vehicle has a center console on a center console rail system extending longitudinally, a center console actuator, and a controller that receives an input commanding a selected passenger compartment arrangement and controls the actuators to position the seat assemblies and center console in the commanded passenger compartment arrangement.

18 Claims, 22 Drawing Sheets

(51) Int. Cl.
| | |
|---|---|
| *B60N 2/02* | (2006.01) |
| *B60N 2/14* | (2006.01) |
| *B60N 2/20* | (2006.01) |
| *B60N 2/75* | (2018.01) |

(52) U.S. Cl.
CPC .......... *B60N 2/0226* (2023.08); *B60N 2/0233* (2023.08); *B60N 2/0237* (2023.08); *B60N 2/0239* (2023.08); *B60N 2/14* (2013.01); *B60N 2/20* (2013.01); *B60N 2/773* (2018.02)

(58) Field of Classification Search
CPC ...... B60N 2/0237; B60N 2/0239; B60N 2/14; B60N 2/20; B60N 2/773; B60N 2/0248
See application file for complete search history.

(56) References Cited

U.S. PATENT DOCUMENTS

| | | | |
|---|---|---|---|
| 2017/0368964 A1* | 12/2017 | Kim | .................. B60N 2/02246 |
| 2021/0380023 A1* | 12/2021 | Kanitz | .................. B60N 2/305 |
| 2022/0144140 A1 | 5/2022 | Kondrad et al. | |
| 2022/0144143 A1 | 5/2022 | Kondrad et al. | |
| 2022/0144145 A1 | 5/2022 | Kondrad et al. | |

\* cited by examiner

VEHICLE HAVING RECONFIGURED PASSENGER COMPARTMENT MODES

FIELD OF THE DISCLOSURE

The present disclosure generally relates to motor vehicles, and more particularly relates to a motor vehicle having an adjustable seating arrangement within the passenger compartment of the vehicle.

BACKGROUND OF THE DISCLOSURE

The passenger vehicles commonly have a passenger compartment typically provided with a plurality of seating assemblies. The positioning of the plurality of seating assemblies within the passenger compartment can define a seating arrangement. Existing approaches of passenger compartment designs typically are limited to merely adjusting the overall seating capacity or forward and rearward or incline adjustments of the seating assemblies. It would be desirable to provide for an adjustable seating arrangement that offers more flexibility.

SUMMARY OF THE DISCLOSURE

According to a first aspect of the present disclosure, a motor vehicle having a passenger compartment with a forward region, a central region, and a rearward region, a floor, a seating rail system positioned on the floor and extending along a longitudinal direction of the motor vehicle, and a plurality of seating assemblies arranged in the passenger compartment in a first row, a second row, and a third row. Each of the seating assemblies has a seat base coupled to the seating rail system, a seat movably coupled to the seat base, a seat back movably coupled to the seat base, and one or more seat actuators configured to actuate the seating assemblies to a plurality of positions. The vehicle also has a center console rail system with a center console positioned on the center console rail system extending longitudinally on the floor, a center console actuator to actuate the center console on the center console rail system, and a controller configured to receive an input commanding a selected passenger compartment arrangement, wherein the controller controls the actuators to position the seat assemblies and the center console in the commanded passenger compartment arrangement.

Embodiments of the first aspect of the present disclosure can include any one or a combination of the following features:

a user input device for inputting selection of the user input, the user input device including one of a phone, a key fob, a microphone, a gesture detecting device, and a touchscreen display;
    a selected seating arrangement including one of a driving mode, a social mode, and a cargo mode;
    a selected passenger compartment arrangement including an office mode and a child seat mode;
    seating assemblies in the second row seating having a swivel actuator for rotating the seats about a vertical axis;
    a third row seating having a seat back adjacent to a rear wall of the passenger compartment;
    a forward region including the first row, a central region including the second row, and a rearward region including the third row in a driving mode;
    a pickup truck having three doors on each of the opposite lateral sides for accessing the three rows of seating.

According to a second aspect of the present disclosure, a pickup truck having a passenger compartment including a forward region, a central region, and a rearward region, a floor, a seating rail system positioned on the floor and extending along a longitudinal direction of the motor vehicle, a plurality of seating assemblies arranged in the passenger compartment in a first row, a second row, and a third row. Each of the seating assemblies having a seat base coupled to the seating rail system, a seat movably coupled to the seat base, a seat back movably coupled to the seat base, and one or more seat actuators configured to actuate the seating assemblies to a plurality of positions. The pickup truck also having a center console rail system, a center console positioned on the center console rail system extending longitudinally on the floor, a center console actuator to actuate the center console on the center console rail system, and a controller configured to receive an input commanding a selected passenger compartment arrangement, wherein the controller controls the actuators to position the seat assemblies and the center console in the commanded passenger compartment arrangement.

Embodiments of the second aspect of the present disclosure can include any one or a combination of the following features:

a user input device for inputting selection of the user input, wherein the user input device having one of a phone, a key fob, a microphone, a gesture detecting device, and a touchscreen display;
    a selected seating arrangement having one of a driving mode, a social mode, and a cargo mode;
    a selected passenger compartment arrangement further includes an office mode and a child seat mode;
    seating assemblies in the second row seating further having a swivel actuator for rotating the seats about a vertical axis;
    third row seating having a seat back adjacent to a rear wall of the cab; and
    three doors on each of opposite lateral sides for accessing the three rows of seating.

These and other features, advantages, and objects of the present disclosure will be further understood and appreciated by those skilled in the art by reference to the following specification, claims, and appended drawings.

DETAILED DESCRIPTION OF PREFERRED EMBODIMENTS

Figures 1, 1A:
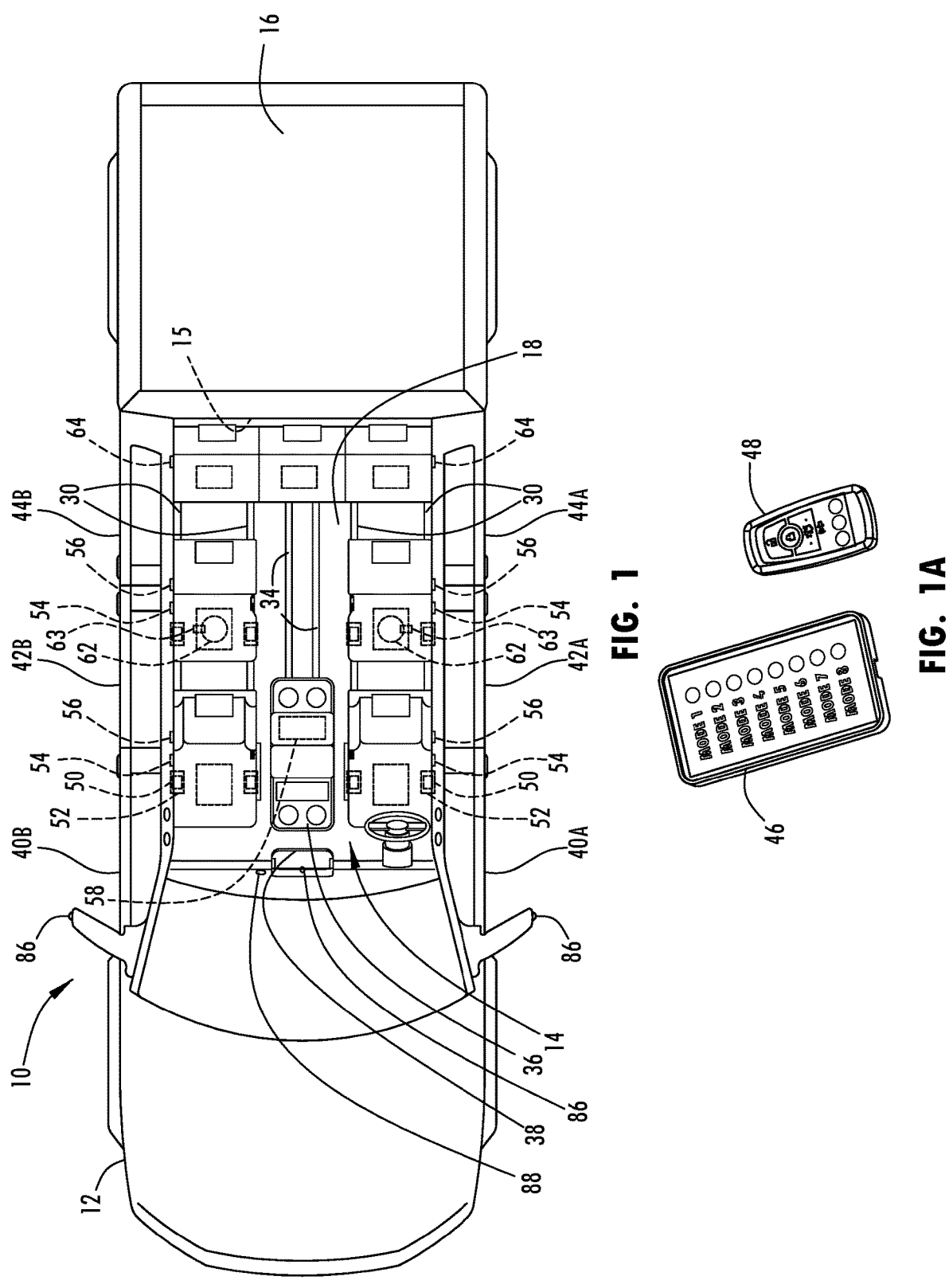
FIG. 1 is a top schematic view of a motor vehicle having a passenger compartment with an adjustable seating and center console arrangement.
FIG. 1A is a perspective view of exemplary user input devices for selecting a passenger seating and center console compartment arrangement of the vehicle.

Reference will now be made in detail to the present preferred embodiments of the disclosure, examples of which are illustrated in the accompanying drawings. Wherever possible, the same reference numerals will be used throughout the drawings to refer to the same or like parts. In the drawings, the depicted structural elements are not to scale and certain components are enlarged relative to the other components for purposes of emphasis and understanding.

As required, detailed embodiments of the present disclosure are disclosed herein; however, it is to be understood that the disclosed embodiments are merely exemplary of the disclosure that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present disclosure.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a vehicle having user selectable seating and center console arrangements and a method of controlling the arrangements. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIG. 1, a motor vehicle 10 is generally illustrated in the form of a pickup truck having a body 12, a cabin interior defining a passenger compartment 14 and a bed 16 at the rear end. The motor vehicle 10 shown and described herein is a pickup truck that includes in the passenger compartment 14 three rows of passenger seating 20, 22, and 24 positioned generally proximate to three rows of six doors 40A-40F with front first and second doors 40A and 40B on opposite sides of the first row of seating 20, middle third and fourth doors 42A and 42B located on opposite lateral sides of the second row of seating 22, and the rear fifth and sixth doors 44A and 44B located on opposite sides of the third row of seating 24. The passenger compartment has a forward region generally including the first row of seating, a central region generally including the second row of seating, and a rearward region generally including the third row of seating. As such, the motor vehicle 10 may seat passengers in three rows which may include two seats in the first row of seating 20, two seats in the second row of seating 22 and three seats in the third row of seating 24, according to the example shown.

The first and second doors 40A and 40B have hinges on the front end that allow the first and second doors 40A and 40B to pivot between open and closed positions. Similarly, the third and fourth doors 42A and 42B have hinges on the front end that allow the third and fourth doors 42A and 42B to pivot between open and closed positions. The first and sixth doors 44A and 44B are smaller doors that pivot about hinges on the rear end when the third and/or fourth doors 42A and 42B are in the open position to present an enlarged size door opening.

Figure 2:
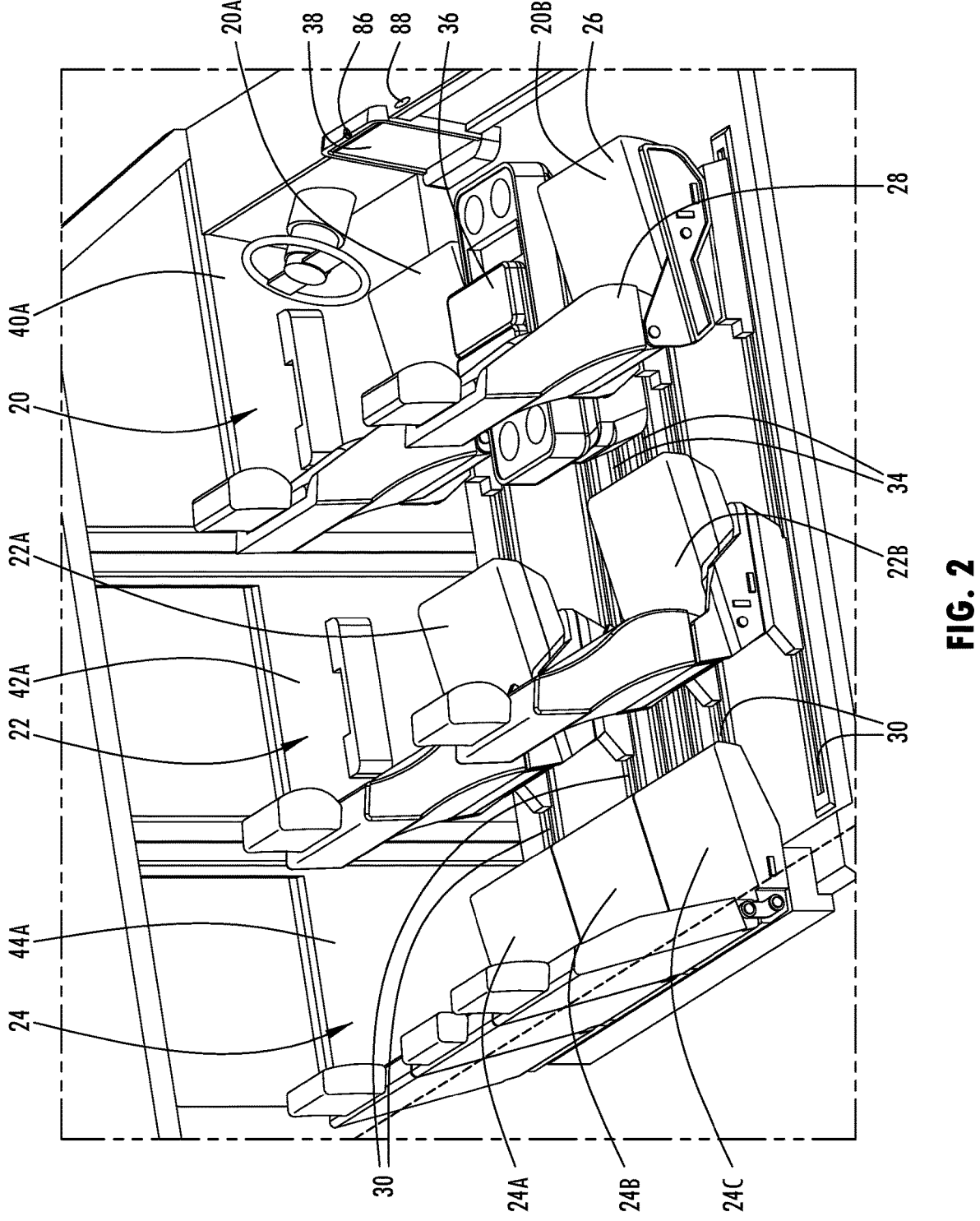
FIG. 2 is a side perspective view of the motor vehicle shown having an arrangement of seating assemblies and the center console in a driving mode.

With reference to FIGS. 1 and 2, the passenger compartment 14 of the motor vehicle 10 is shown having a first seat assembly 20A and a second seat assembly 20B located in the first or front row of seating 20. The first seat assembly 20A may be a driver's seat which is generally located rearward of a steering wheel. Each of the seat assemblies 20A and 20B generally include a seat base 26 and a seat back 28 which may recline and incline relative to the seat base 26.

The second or middle row of seating 22 includes a third seat assembly 22A and a fourth seat assembly 22B. Each of the third and fourth seat assemblies 22A and 22B includes a seat base 26 and a seat back 28 which may rotate to incline or recline relative to the seat base 26. The second row of seating 22 is generally positioned vehicle rearward of the first row of seating.

The third or rear row of seating 24 includes a fifth seat assembly 24A, a sixth seat assembly 24B and a seventh seat assembly 24C. The sixth seat assembly 24B is generally located between the fifth and seventh seat assemblies 24A and 24C. The fifth, sixth and seventh seat assemblies 24A, 24B, and 24C include the seat base and a seat back 28 which may extend the entire width of the third row of seating 24. The seat back 28 of the third row of seating 24 may be fixed generally up against a rear wall 15 of the passenger compartment 14 and as such may not be adjustable in terms of incline or recline. The seat base 26 of the third row of seating 24 may be actuated to pivot upwards to a folded upright stowed position to allow for enhanced access or storage in the passenger compartment 14.

The first row of seating 20 and the second row of seating 22 includes seats that are mounted or assembled onto a seating rail system having pairs of rails 30 and 32 that may form tracks that extend on the floor 18 longitudinally in the vehicle passenger compartment 14 to allow each of the seat assemblies 20A-20D to move forward and rearward. To do so, each of the seat assemblies 20A and 20B and 22A and 22B is coupled to a pair of rails 30 or 32 or tracks on opposite lateral sides and is actuated via a seat linear motor 50 and gear 52, for example, to move the corresponding seat vehicle forward or rearward on the pair of rails or tracks.

In addition, the motor vehicle 10 has a center console 36 generally located between the first seat assembly 20A and the second seat assembly 20B as seen in FIG. 2. The center console 36 is mounted onto a center console rail system having a pair of rails 34 that may form tracks that extend on the floor 18 longitudinally in the vehicle passenger compartment 14. As such, the center console 36 may move vehicle forward to the position shown in FIG. 2 or may move vehicle rearward to a position located between the third seat assembly 22A and the fourth seat assembly 22B in the second row of seats 22 and presented in front of the third row of seating 24, particularly directly in front of the sixth seat assembly 24B. The center console 36 is actuated to move vehicle rearward and forward with an actuator having a center console motor 58 and may include a gear, according to one example. The third and fourth seat assemblies 22A and 22B arranged in the second row of seating 22, further include a swivel actuator having a seat swivel motor 62 that may actuate the corresponding seat assembly to rotate or swivel the seat assembly about a vertical axis such as to move from a normally vehicle forward-facing position ninety degrees (90°) to a lateral or one hundred eighty degrees (180°) to a vehicle rearward-facing position. The rails or tracks may include slide rails operatively coupled to tracks that allow the rails to slide relative to the tracks.

It should be appreciated that the movement of the seat assemblies and the center console are realized to achieve a user selected passenger compartment arrangement in response to a user input. The user input may include a touchscreen display 38, a portable electronic device such as a phone 46, or a key fob 48, or a microphone to receive spoken input commands, or a hand gesture device to detect gesture inputs via a camera or other sensor for example. The seating assemblies and center console may be positioned in a plurality of selectable passenger compartment arrangements which are shown in FIGS. 2-9, for example. The passenger compartment arrangements with the seating and center console positioning may be moved between the plurality of selectable modes as shown in the state diagram shown in FIG. 10, according to one example.

In FIG. 2, the motor vehicle 10 is shown arranged in a driving mode which is the normal customary forward-facing seating arrangement with the center console 36 located between the front and second seat assemblies 20A and 20B in the front row of seating 20. In this arrangement, occupants including the driver and passengers are all generally seated forward facing and the center console 36 is positioned and available for the driver and front row passenger to rest their arm on the console lid/armrest and to position one or more drink containers or other items on the center console 36.

Figure 3:
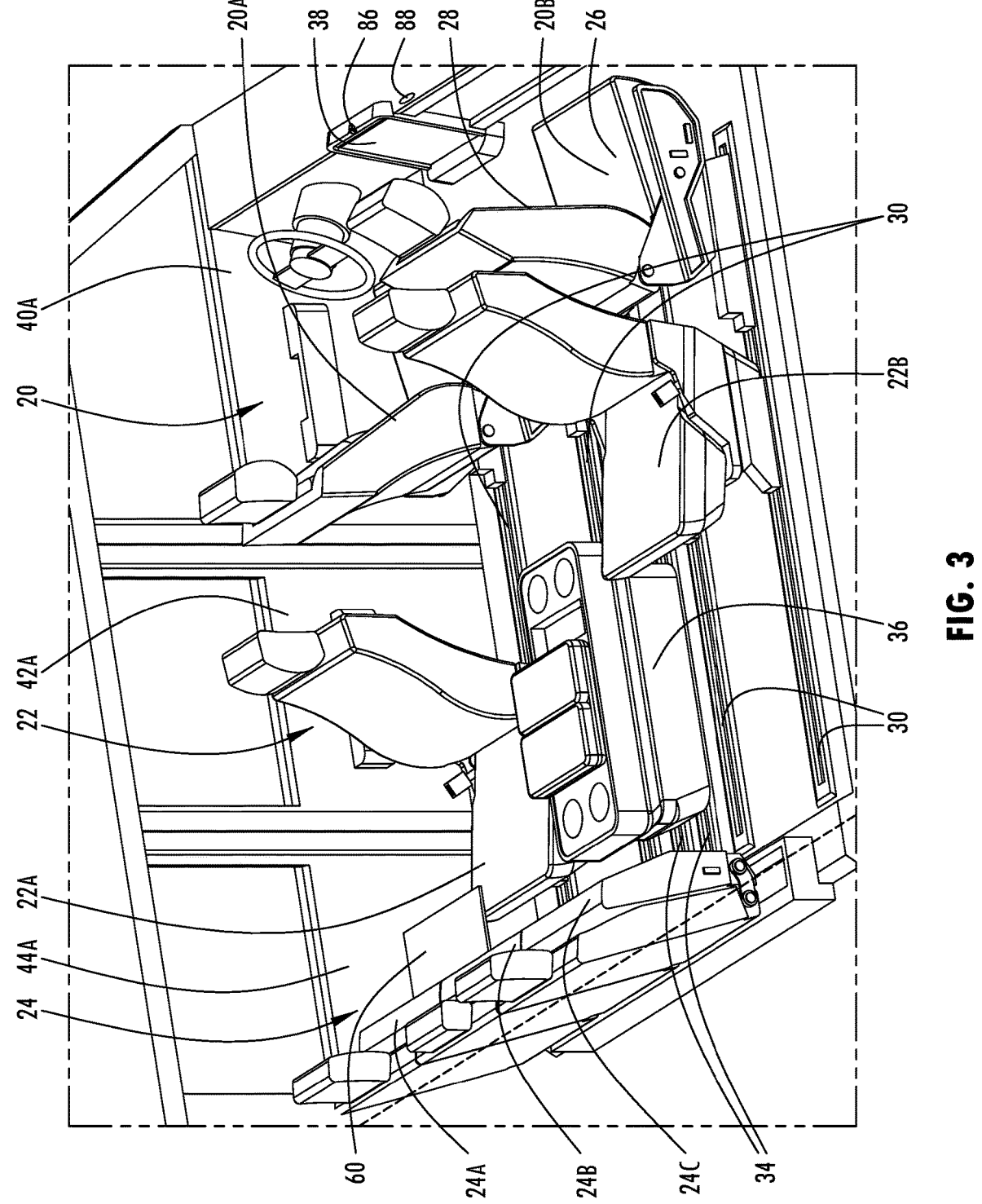
FIG. 3 is a side perspective view of the motor vehicle shown having an arrangement of seating assemblies and the center console in an office mode.

The seating assemblies and the center console 36 are movable to other locations and positions such as the office mode passenger compartment arrangement as shown in FIG. 3. In this office mode arrangement, the third and fourth seat assemblies 22A and 22B in the second row of seating are swiveled and rotated one hundred eighty degrees (180°) to face vehicle rearward. In addition, the seat base of the third row of seating is actuated upwards to a vertical position and a worktable 60 is deployed to provide the worktable 60 in front of the third seat assembly 22A. Additionally, the center console 36 is actuated to a vehicle rearward position to place the center console 36 adjacent to the third and fourth seat assemblies 22A and 22B. In this position, one or more occupants of the motor vehicle 10 may be presented with a work environment. In the office mode arrangement, the motor vehicle 10 is generally expected not to be operating, is to be in park, and not moving.

Figure 4:
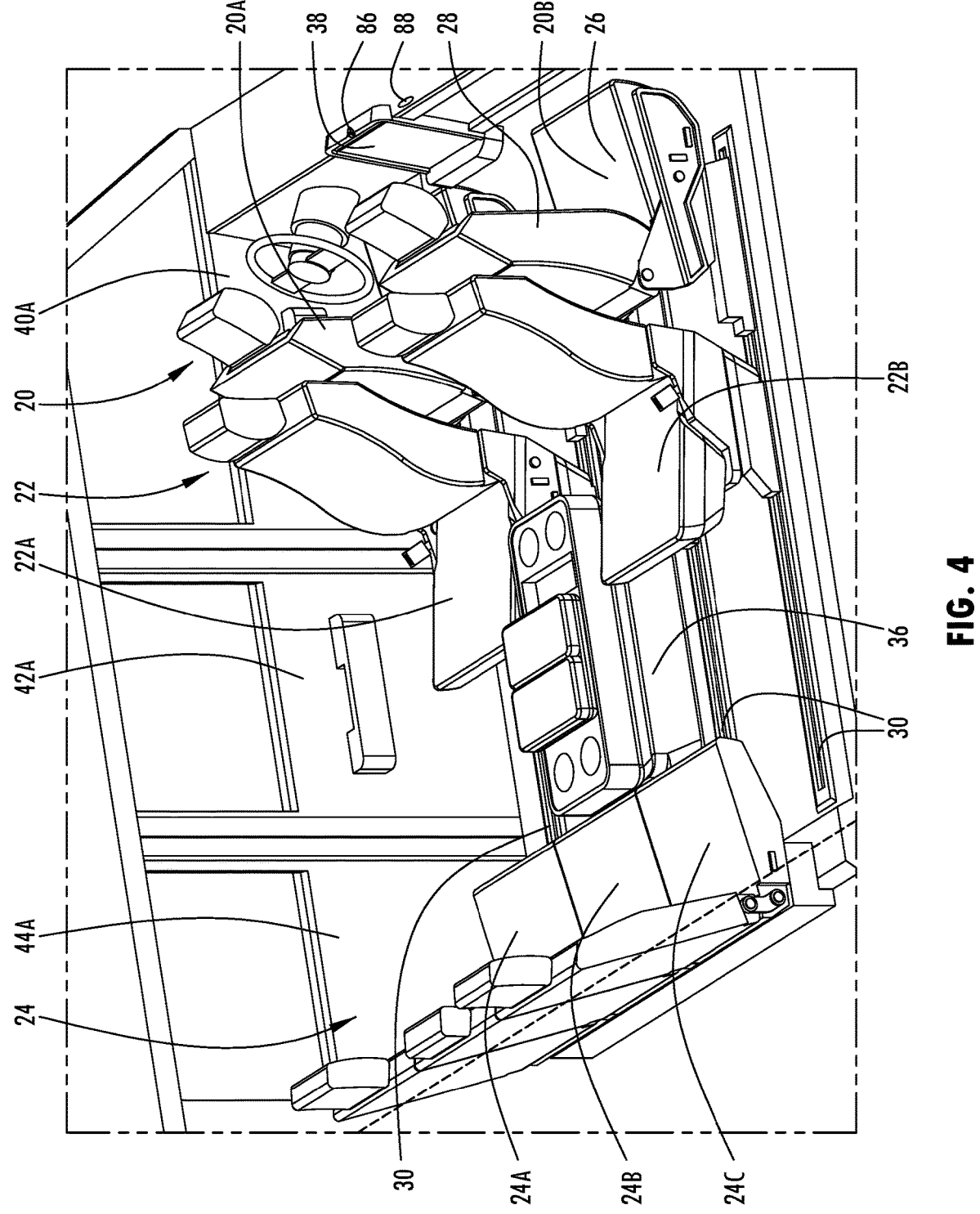
FIG. 4 is a side perspective view of the motor vehicle shown having an arrangement of seating assemblies and the center console in a social mode.

Referring to FIG. 4, the vehicle passenger compartment 14 interior is shown in a social mode arrangement with the third and fourth seat assemblies 22A and 22B of the second row of seating 22 shown in a vehicle rearward-facing position generally facing the third row of seating 22 with the seat base of a third row of seating 24 in the downward horizontal or seating position and the center console 36 is generally positioned rearward in the motor vehicle 10. In the social mode arrangement, the motor vehicle 10 is generally expected not to be operating, is to be in park, and not moving.

Figure 5:
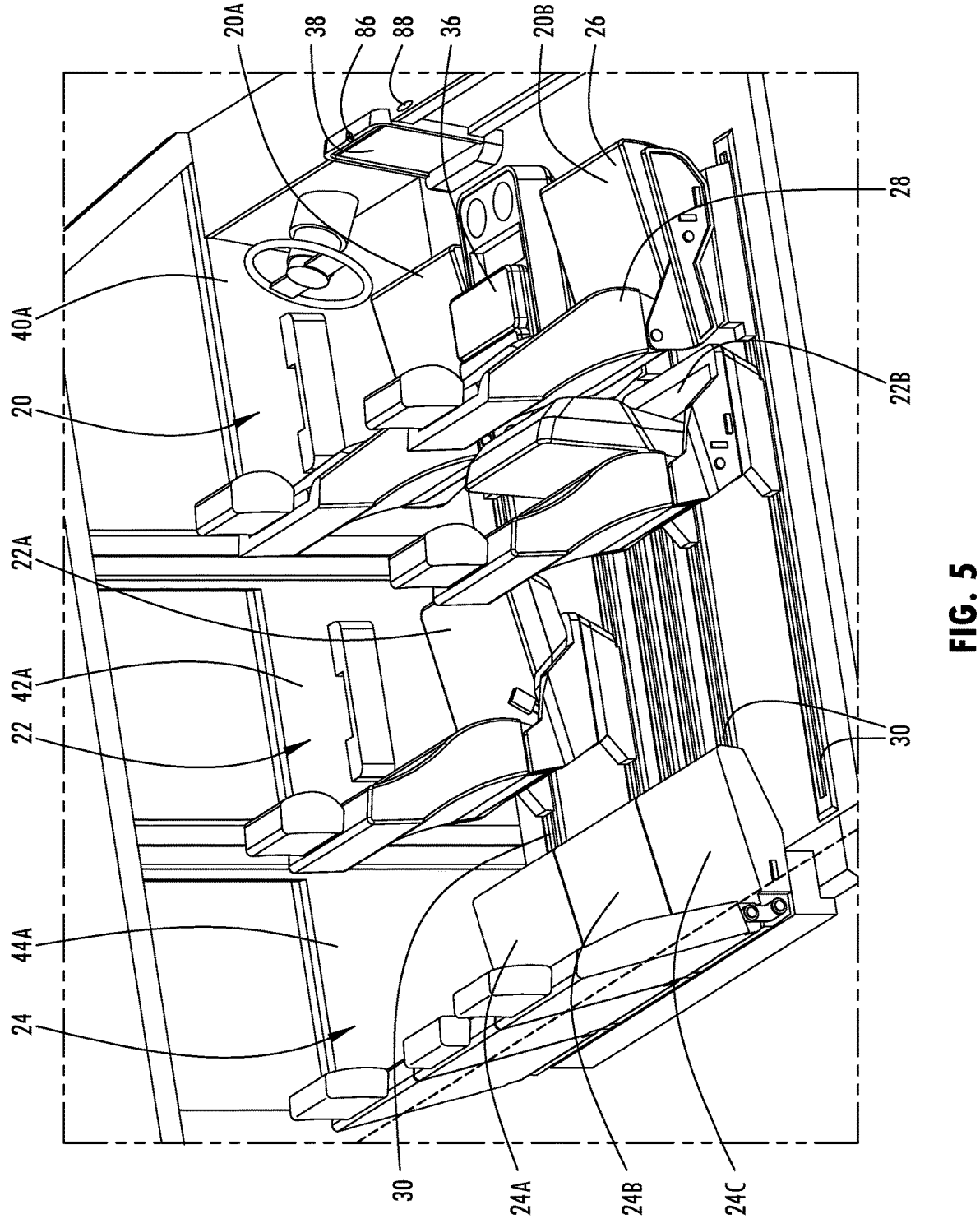
FIG. 5 is a side perspective view of the motor vehicle shown having an arrangement of seating assemblies and the center console in a third row access mode.

Referring to FIG. 5, the passenger compartment 14 of the motor vehicle 10 is shown having the seating assemblies and center console 36 arranged in a third row access mode. In this mode, the fourth seat assembly 22B in the second row of seating 22 is actuated to a forward position with the seat base actuated upward so as to be compactly located behind the second seat assembly 20B. In addition, the second seat assembly 20B is preferably actuated to a forwardmost position. The seat base of the third row of seating assembly is presented in the horizontal seating position. The center console 36 remains in the generally forward position. In this configuration, an enlarged open space is presented between the fourth seating assembly 22B and the third row of seating 24 to allow access to the third row of seating. It should be appreciated that the second and third rows of doors may provide a sufficiently large opening to access the passenger compartment 14 of the motor vehicle 10 in this configuration.

Figure 6:
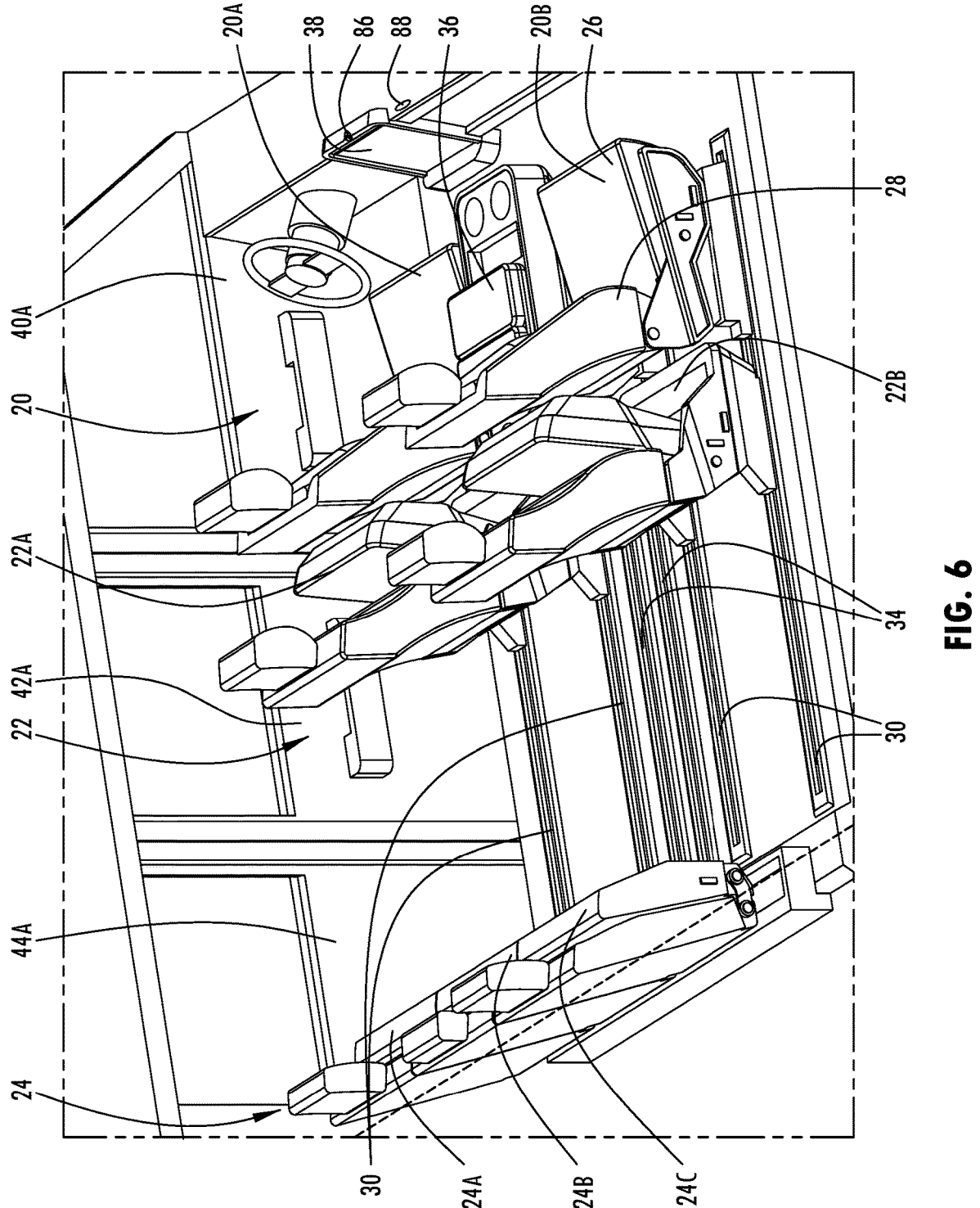
FIG. 6 is a side perspective view of the motor vehicle shown having an arrangement of seating assemblies and the center console in a first cargo mode.

In FIG. 6, the passenger compartment 14 of the motor vehicle 10 is illustrated in a first cargo mode which offers an enlarged storage area within the rear portion of the passenger compartment 14. In the first cargo mode, the third and fourth seat assemblies 22A and 22B of the second row of seating 22 have the seat bases folded to the upright stowed position and the seat assemblies are actuated to a forwardmost position. In addition, the seat base of the third row of seating 24 is actuated to an upright stowed position. As a result, an enhanced area for storage is presented between the third row of seating 24 and second row of seating 22.

Figure 7:
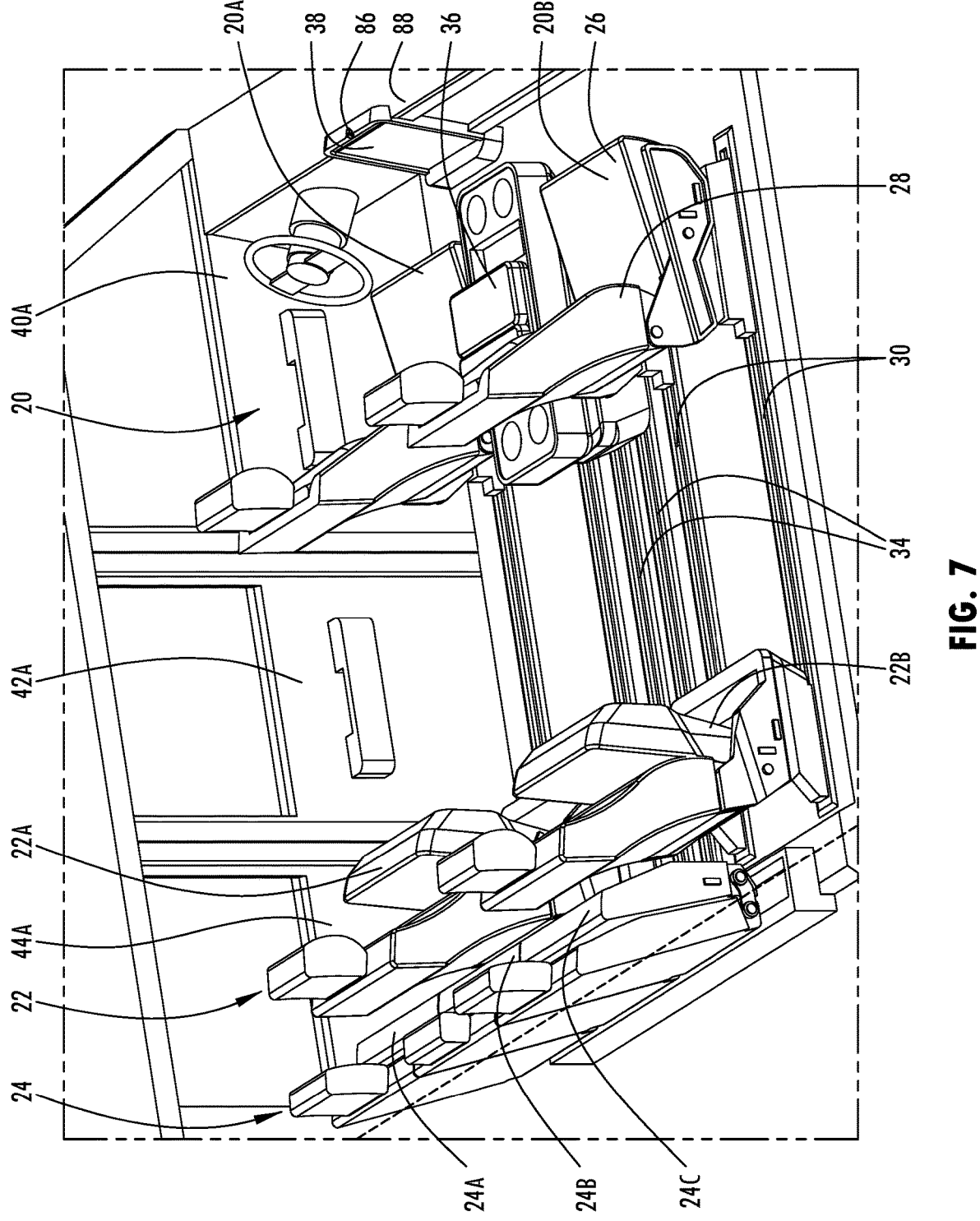
FIG. 7 is a side perspective view of the motor vehicle shown having an arrangement of seating assemblies and the center console in a second cargo mode.

In FIG. 7, the passenger compartment 14 of the motor vehicle 10 is illustrated in a second cargo mode configuration. In this configuration, the third and fourth seat assemblies 22A and 22B are folded such that the seat base is folded upwards to a stowed position and the third and fourth seat assemblies 22A and 22B are actuated to the rearmost position in the passenger compartment 14 of the motor vehicle 10 with the seat base on the third row of seating 24 in the stowed position. In this position, an enlarged area for storage is provided between the first row of seating 20 and second row of seating 22. This is particularly useful for when moving cargo into and out of the passenger compartment 14 with the motor vehicle 10 via the second row of doors 42A and 42B and third row of doors 44A and 44B.

Figure 8:
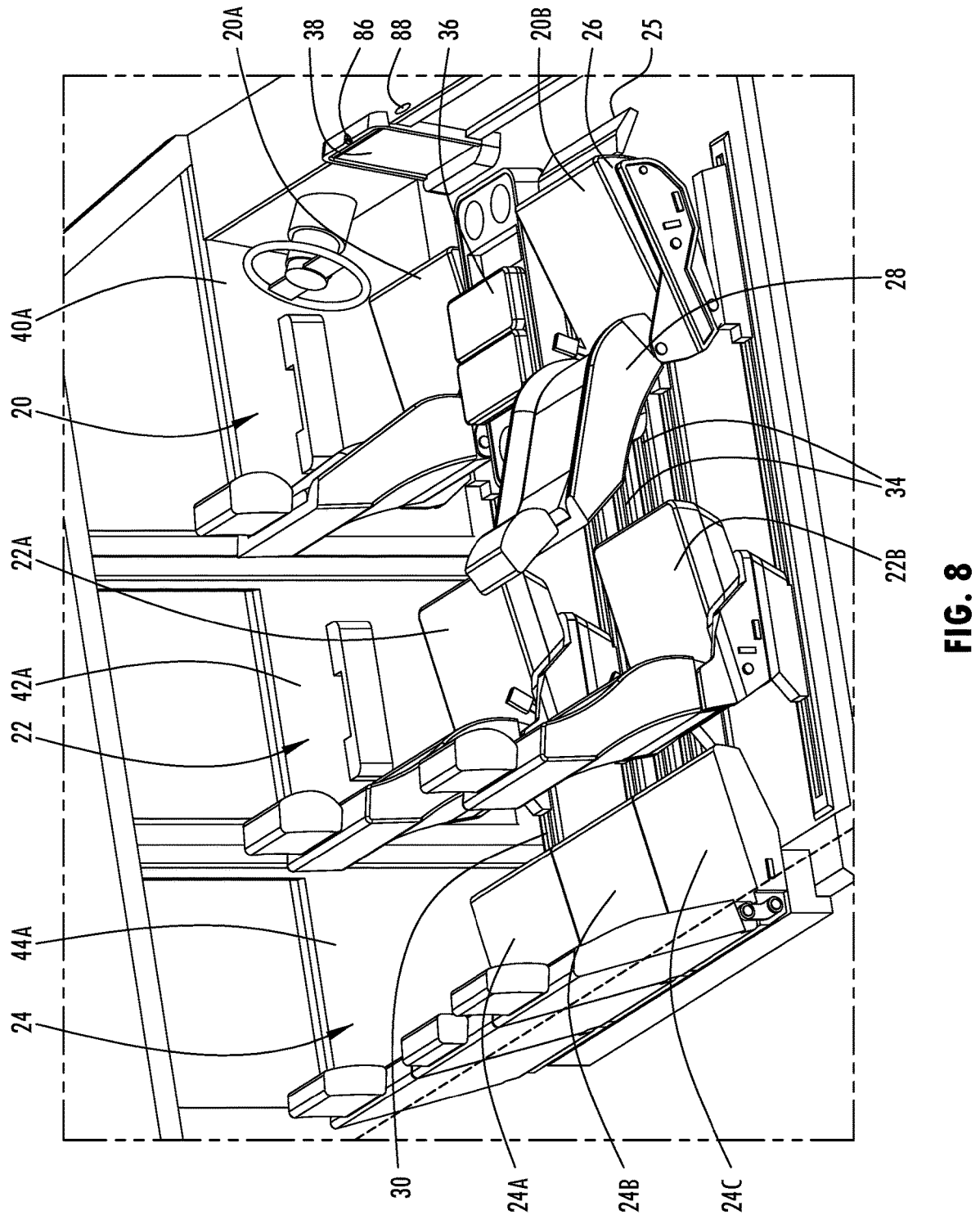
FIG. 8 is a side perspective view of the motor vehicle shown having an arrangement of seating assemblies and the center console in a relaxed mode.

In FIG. 8, the passenger compartment 14 of the motor vehicle 10 is illustrated arranged in a relaxed mode, according to one example. In this mode, the second seat assembly 20B is actuated to a reclined position in which the seat back is reclined rearward and the remaining seat assemblies are generally shown positioned in a vehicle forward orientation. In the relaxed mode arrangement, the motor vehicle 10 is generally expected not to be operating, is to be in park, and not moving.

Figure 9:
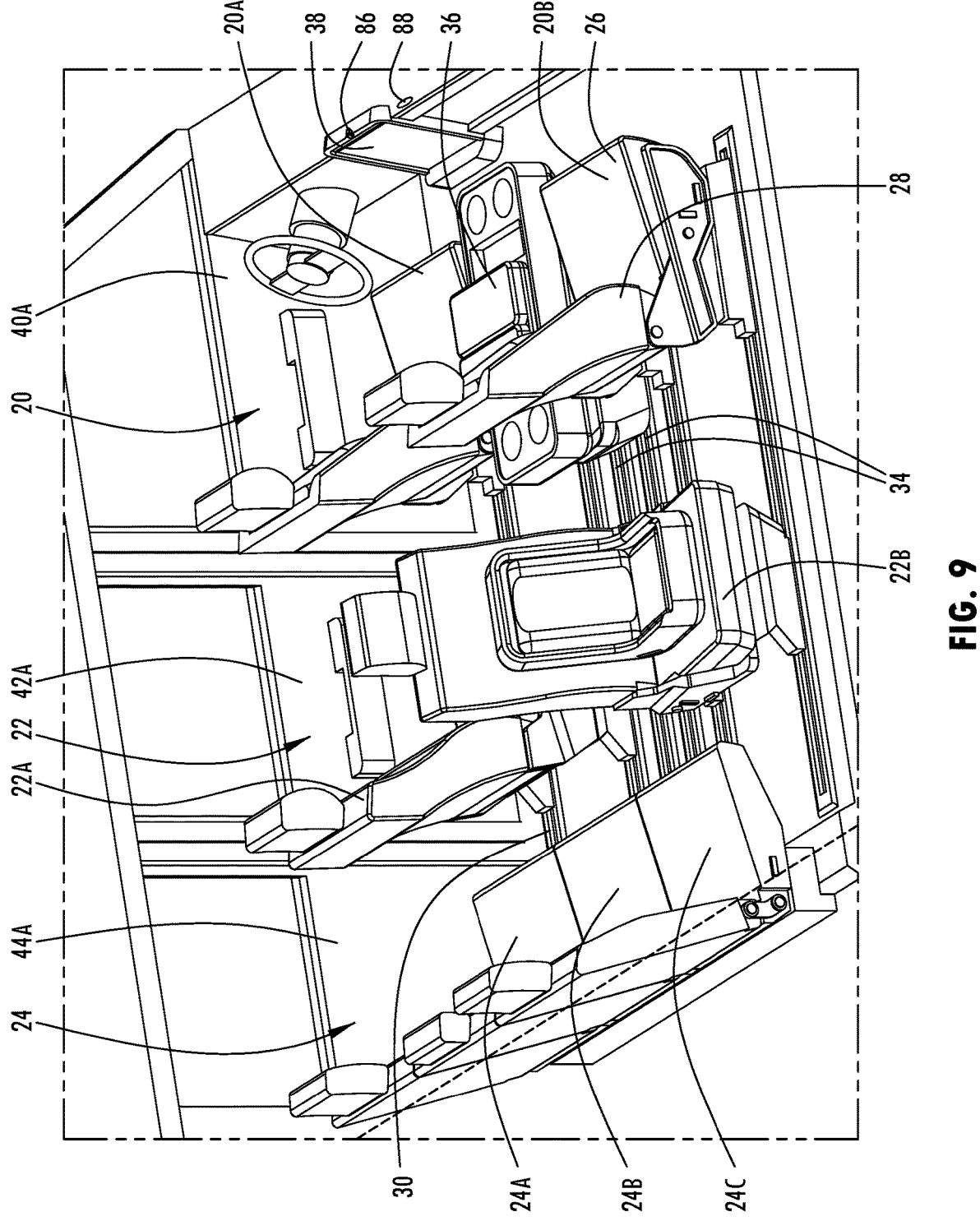
FIG. 9 is a side perspective view of the motor vehicle shown having an arrangement of seating assemblies and the center console in a child seat load mode.

In FIG. 9, the passenger compartment 14 of the motor vehicle 10 is illustrated arranged in a child seat mode arrangement. In this arrangement, the fourth seat assembly 22B in the second row of seating 22 is rotated about a vertical axis to swivel ninety degrees (90°) to a lateral-facing position facing the middle door on the same side of the motor vehicle 10. In this position, a young child, e.g., infant, may be easily loaded or unloaded into a base seat or into the seat itself from an open door on the side of the motor vehicle 10. The remaining seats may remain in their generally vehicle forward-facing positions. In the child seat mode arrangement, the motor vehicle 10 is generally expected not to be operating, is to be in park, and not moving.

Figure 10:
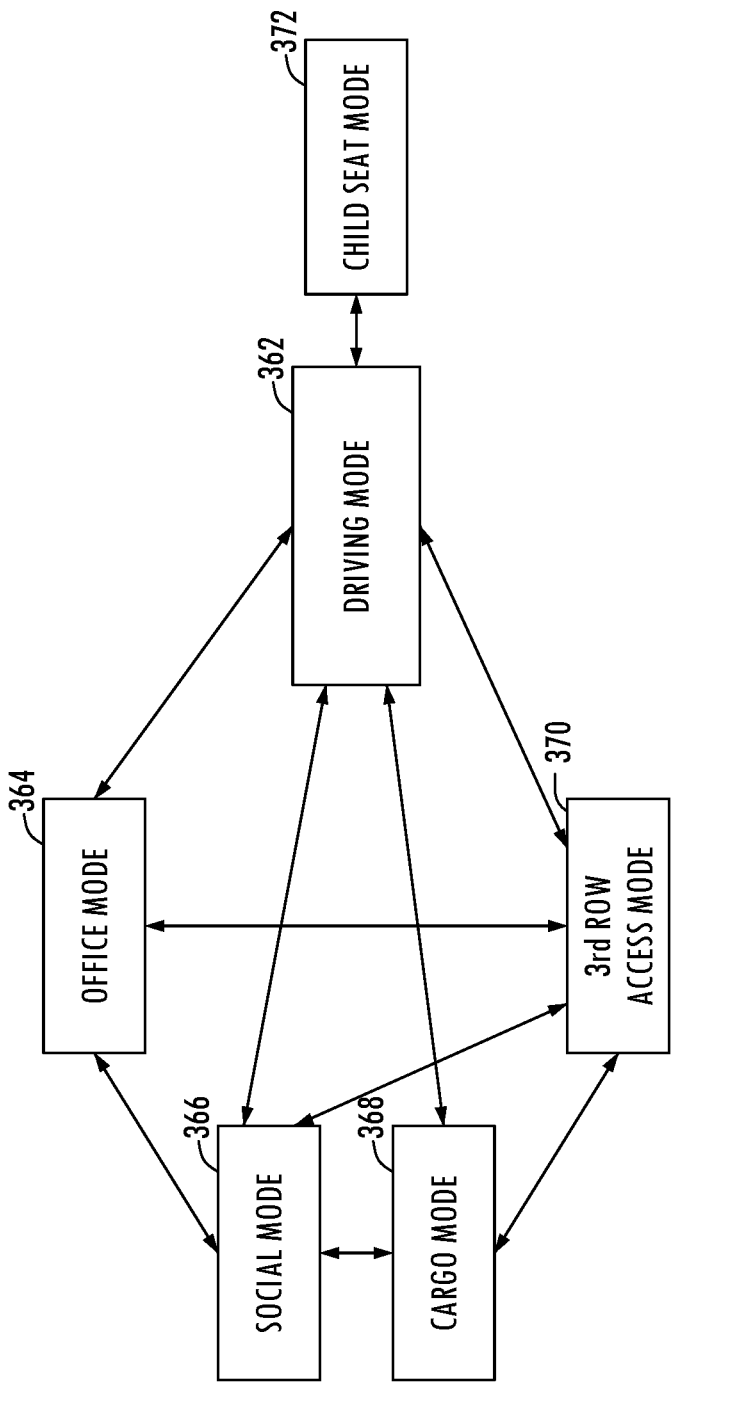
FIG. 10 is a state diagram illustrating a plurality of selectable passenger seat and center console modes, according to one embodiment.

Referring to FIG. 10, a plurality of selectable passenger compartment arrangement modes are illustrated according to a state diagram. It should be appreciated that the state diagram includes each of the selectable modes shown in FIGS. 2-9. In the example shown, the state diagram includes the driving mode 362, the child seat mode 372, the office mode 364, the social mode 366, the cargo modes 368, which may include the first and second cargo modes, and the third row access mode 370. Additional modes such as the relaxed mode, for example, may be included in other examples. It should be appreciated that the seating and center console configuration may change from one mode to another mode based on user selectable inputs. It should also be appreciated that when the motor vehicle 10 is in a first user-selected mode, the motor vehicle 10 may transition from any one mode as shown by the state diagram to any other different mode upon request by a user providing an input through a user input device such as a phone 46, a key fob 49, or an input on a user device 38 including the touch screen display or a microphone, or a gesture detecting device, or other input devices.

Figure 11:
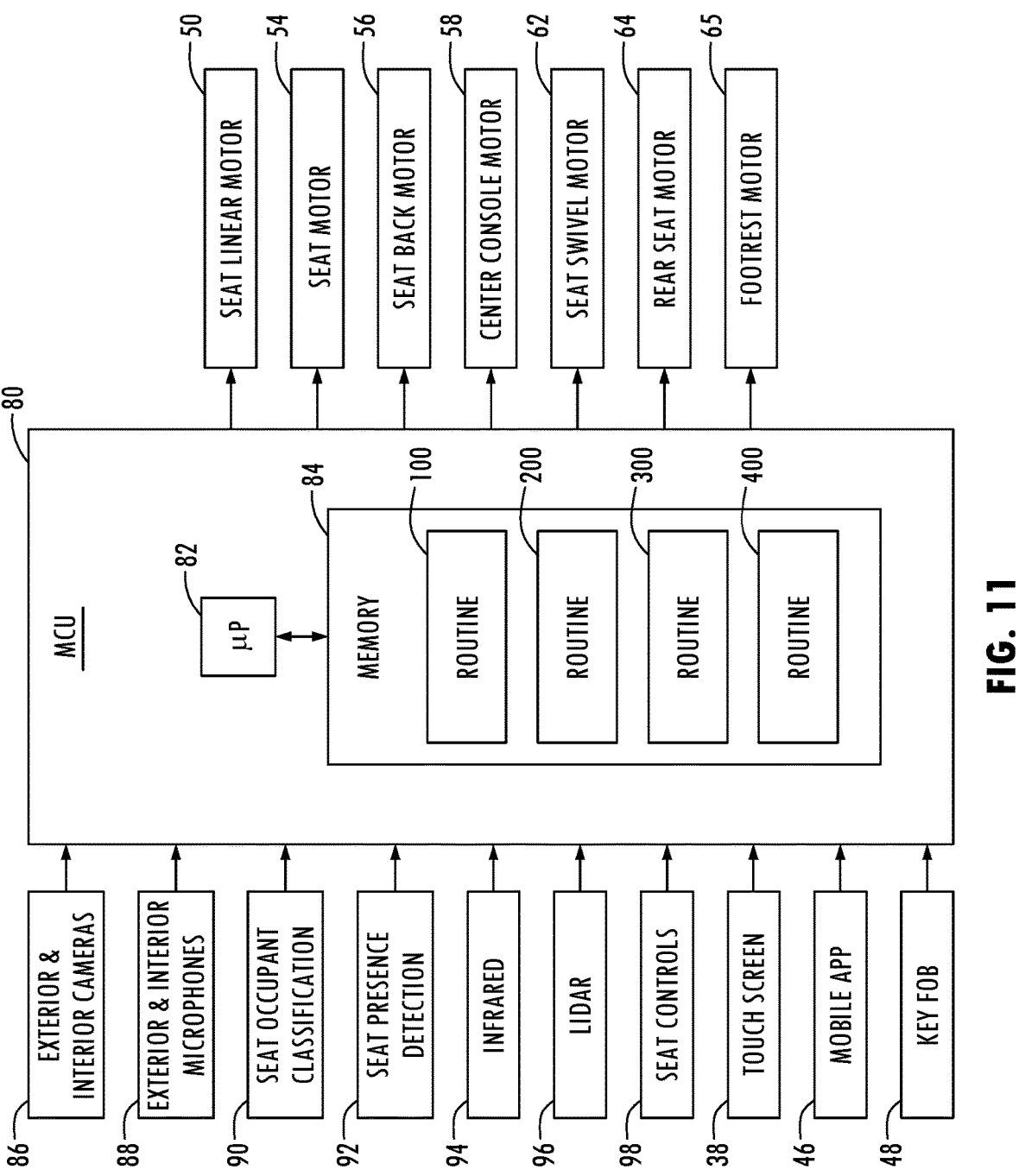
FIG. 11 is a block diagram illustrating a controller for receiving a user selectable passenger arrangement input command and controlling the seating and center console to reconfigure the cabin interior in the selected arrangement.
Figure 12A:
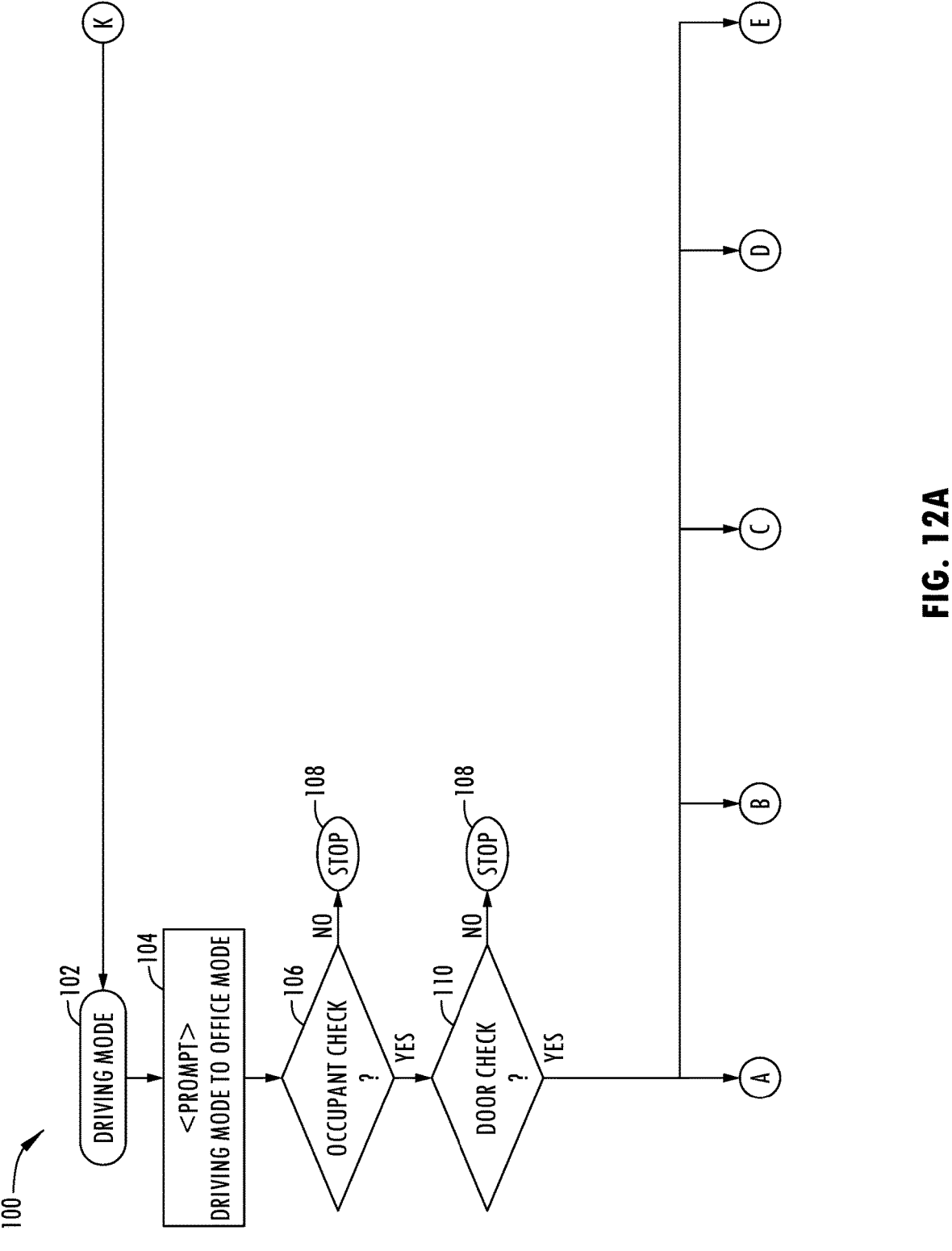
FIGS. 12A-12D are a flow diagram illustrating a routine for initiating a selectable arrangement of the passenger seating and center console.
Figure 12B:
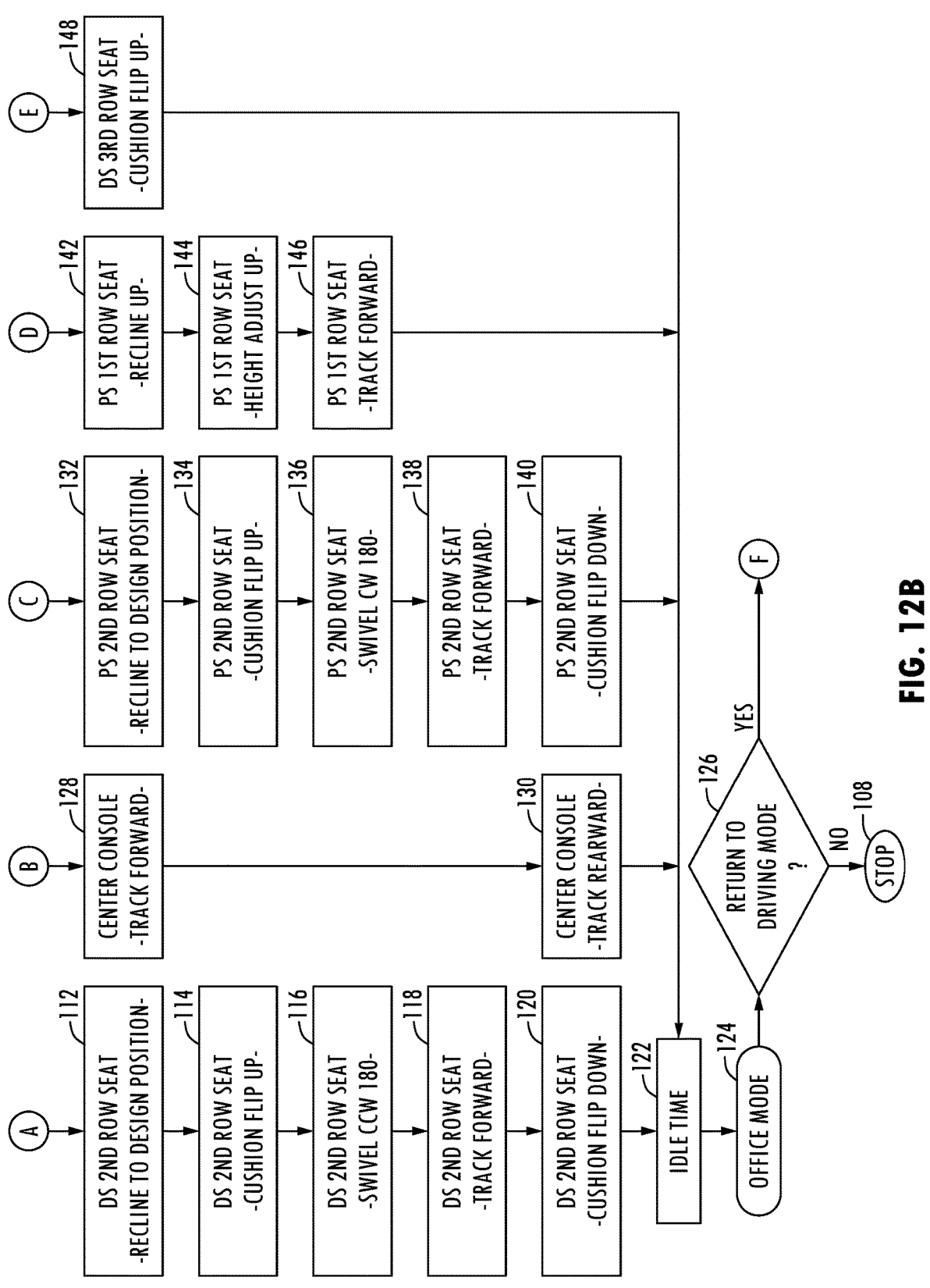
Figure 12C:
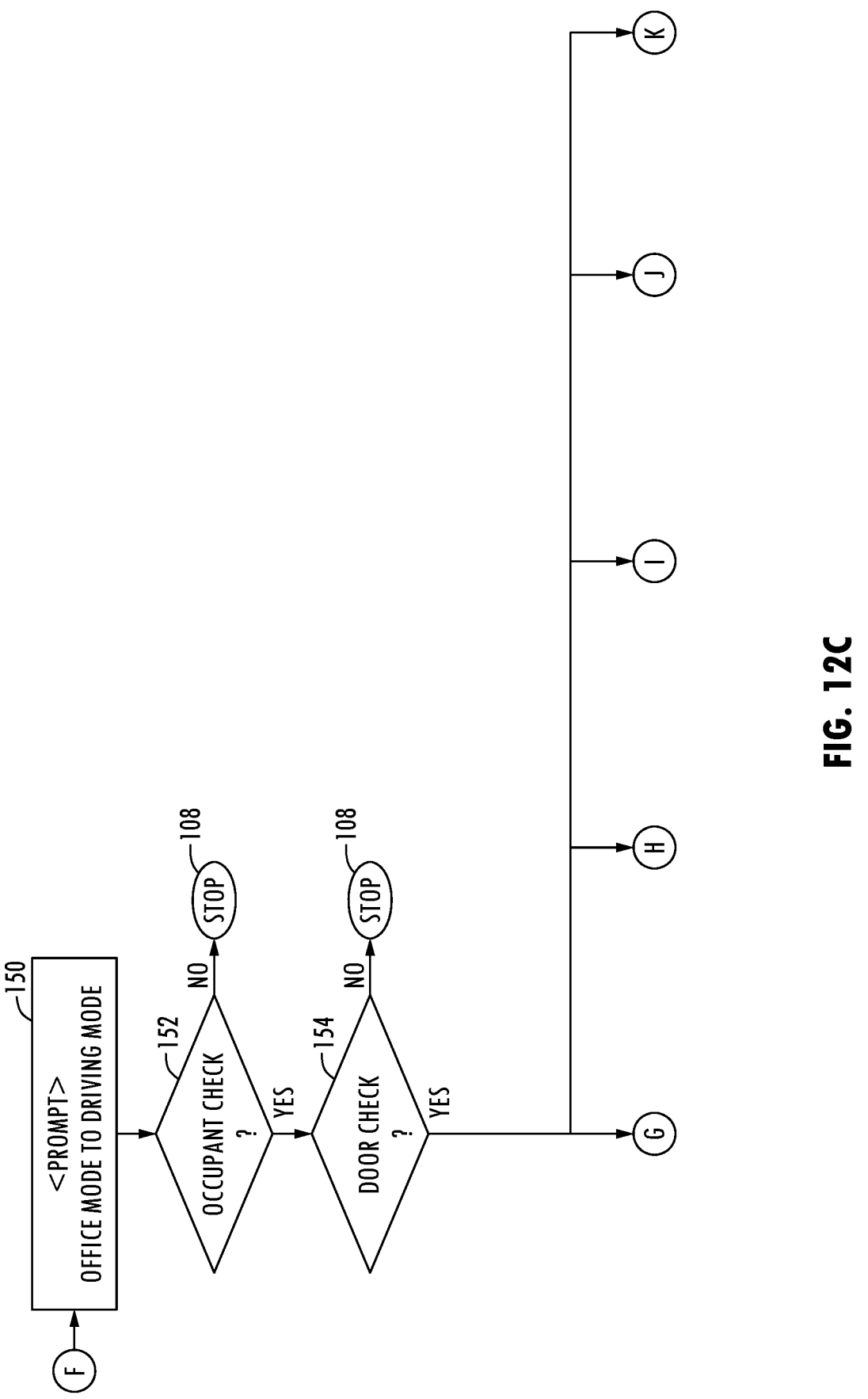
Figure 12D:
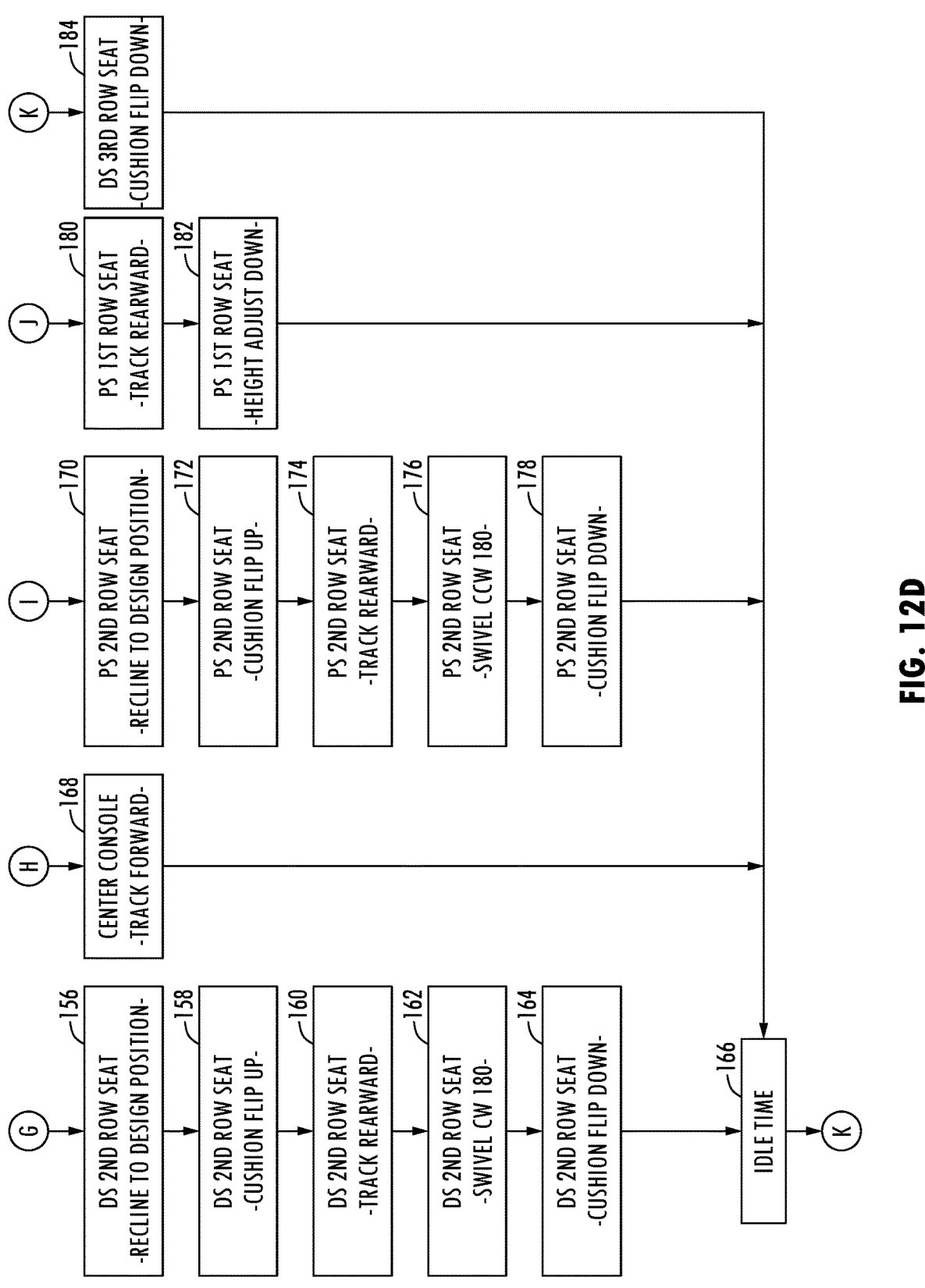

The motor vehicle 10 is equipped with a controller 80 that controls the operation and actuation of the various seating assemblies and center console to achieve a user selected passenger compartment arrangement pursuant to the passenger seating and center console mode. The controller 80 is shown in FIG. 11, according to one example. The controller 80 may include a microprocessor 82 or other analog and/or digital circuitry. In addition, the controller 80 may include memory 84, which may be configured to store one or more routines 100, 200, 300, 400, for controlling actuation of the seat assemblies and center console to a particular passenger compartment arrangement based on the user selected mode. Further, the setpoints for each of the seats and the center console in the various positions may be stored in memory 84.

The controller 80 receives various inputs which, in the example shown, includes inputs from the exterior and interior cameras 86, inputs from the exterior and interior microphones 88, the seat occupant classification 90, the seat presence detection 92, signals from infrared sensor 94, signals from one or more lidar sensors 96, seat control inputs 98, as well as inputs from the touchscreen 38, a microphone 88, a camera 86, a mobile app 46, and from the key fob 48. The controller 80 may process the various inputs with one more of the routines 100, 200, 300, 400 to generate control signals to control various output devices. In the example shown, the output devices may include the seat linear motors 50 for each seat, the seat motors 54 for each seat, the seat back motors 56 for each seat, the center console motor 58, the seat swivel motors 62 for each seat, the rear seat motors 64 for each seat, and the footrest motors 65 associated with each seating assembly or the center console. By controlling actuation of the various motors, the configuration of the seating arrangement and the center console amongst the plurality of passenger compartment modes may be controlled.

Referring to FIGS. 12A-12D, a control routine 100 is illustrated for transitioning the vehicle passenger compartment between the driving mode and the office mode, according to one example. Routine 100 begins at step 102 in the driving mode and proceeds to step 104 to receive a user input prompt to transition from the driving mode to the office mode. Routine 100 then proceeds at the decision step 106 to check for occupants in the vehicle. If one or more occupants are detected in the vehicle, routine 100 will stop at stop 108. If no occupants are detected in the vehicle, routine 100 proceeds to perform a door check at step 110. If there is a door open, routine stops at step 108. Otherwise, if no doors are detected open, routine 100 proceeds to each of steps 112, 128, 132, 142, and 148.

At step 112, routine 100 will adjust the driver's side second row seat to recline to the design position which is the normal vehicle forward facing seating position. Next, at step 114, the driver's side second row seat cushion will be flipped to an upright position. At step 116, the driver's side second row seat will swivel counter-clockwise one hundred eighty degrees (180°) to face vehicle rearward. Next, at step 118, the driver's side second row seat track will move forward and, at step 120, the driver's side second row seat cushion will flip down to the seated position. Routine 100 then proceeds to step 122 to wait for an idle time to expire before proceeding to step 124 to complete entry to the office mode.

At step 128, routine 100 will command the center console to move forward on the track or rails and proceed to step 130 to command the center console track to move vehicle rearward. Routine 100 will then wait for the idle time to expire at step 122 before proceeding to complete entry to the office mode at step 124.

At step 132, the passenger side second row seat is commanded to recline to the design position. Next, at step 134, the passenger side second row seat is commanded to flip up the cushion to the upright position. At step 136, the passenger side second row seat is commanded to swivel clockwise about a vertical axis one hundred eighty degrees (180°) to face vehicle rearward. At step 138, the passenger side second row seat is commanded to move forward on the track or rails. At step 140, the passenger seat second row seat cushion is commanded to flip down to the seating position before proceeding to wait for the idle time to expire at step 122 and then proceeds to complete entry to the office mode at step 124.

At step 142, the passenger side first row seat is commanded to recline up. Next, at step 144, the passenger side first row seat is adjusted upwards in height. Thereafter, the passenger side first row seat is moved forward on the track at step 146 and then routine 100 waits for the idle time to expire at step 122 before proceeding to complete entry to the office mode at step 124.

At step 148, the driver's side third row seat is commanded to flip up the cushion to the upright position. Thereafter, routine 100 waits for the idle time to expire at step 122 before proceeding to complete entry to the office mode at step 124.

After completing entry to the office mode at step 124, routine 100 proceeds to decision step 126 to determine whether the seating arrangement should return to the driving mode and, if not, stops at step 108. If the passenger seating arrangement is determined to return to the driving mode, routine 100 proceeds to step 150 to receive a user input prompt from the user to transition from the office mode to the driving mode. Next, at decision step 152, routine 100 performs an occupant check. If occupants are detected pursuant to this check, routine 100 stops at step 108. If there are no occupants detected, routine 100 proceeds to perform a door check at step 154. If any doors are determined to be open, routine 100 stops at step 108. If the door check shows the doors are closed, routine 100 proceeds to each of steps 156, 168, 170, 180, and 184.

At step 156, routine 100 commands the driver's side second row seat to move from the recline position to the design position. Next, at step 158, the driver's side second row seat cushion is commanded to flip up to an upright position. Next, at step 160, the driver's side second row seat is moved vehicle rearward on the track or rails. At step 162, the driver's side second row seat is rotated to swivel clockwise about a vertical axis one hundred eighty degrees (180°) to face vehicle forward. Next, at step 164, the driver's side second row seat cushion is flipped down to the use position before proceeding to step 166 to wait out an idle time to expire.

At step 168, routine 100 commands the center console to move forward on the track or rails. Thereafter, routine 100 proceeds to wait for the idle time to expire at step 166.

At step 170, the passenger side second row seat is commanded to move from the recline position to the design position. At step 172, the passenger side second row seat is commanded to flip up the cushion to the upright position. At step 174, the passenger side second row seat is commanded to move vehicle rearward on the track or rails. At step 176, the passenger side second row seat is commanded to rotate to swivel counterclockwise one hundred eighty degrees (180°) to the vehicle forward facing position. At step 178, the passenger side second row seat cushion is commanded to flip down to the use position. Thereafter, routine 100 proceeds to wait for the idle time to expire at step 166.

At step 180, the passenger side first row seat is commanded to move vehicle rearward on the track. Next, at step 182, the passenger side first row seat is commanded to be adjusted downward in height. Thereafter, routine 100 waits for the idle time to expire at step 166.

At step 184, the driver's side third row seat cushion is commanded to flip down to the use position. Thereafter, routine 100 waits for the idle time to expire at step 166. Following expiration of the idle time at step 166, routine 100 returns to step 102 with the seating and center console arranged in the driving mode.

Figure 13A:
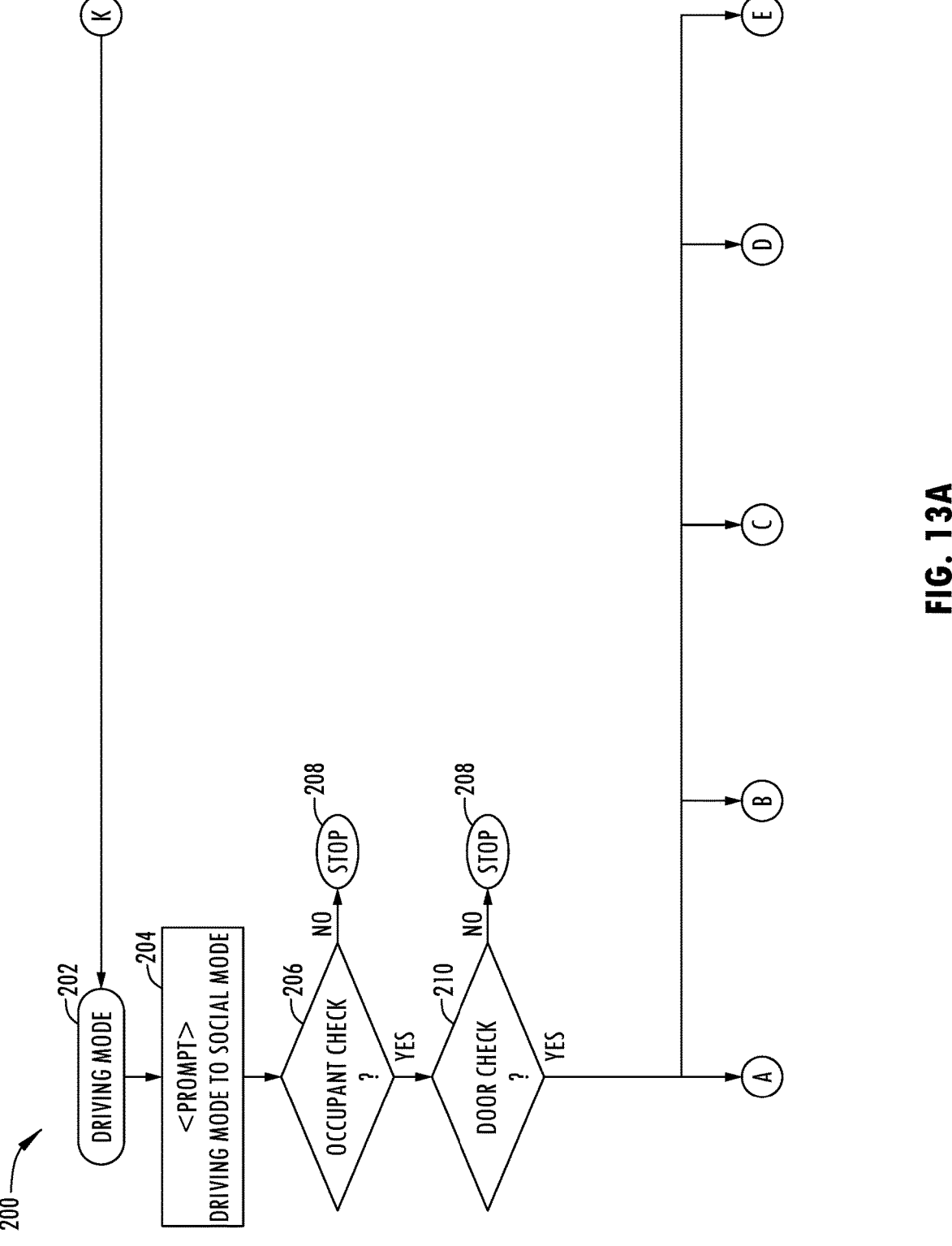
FIGS. 13A-13D are a flow diagram illustrating a routine for transitioning the passenger compartment from the driving mode to the office mode, according to one example.
Figure 13B:
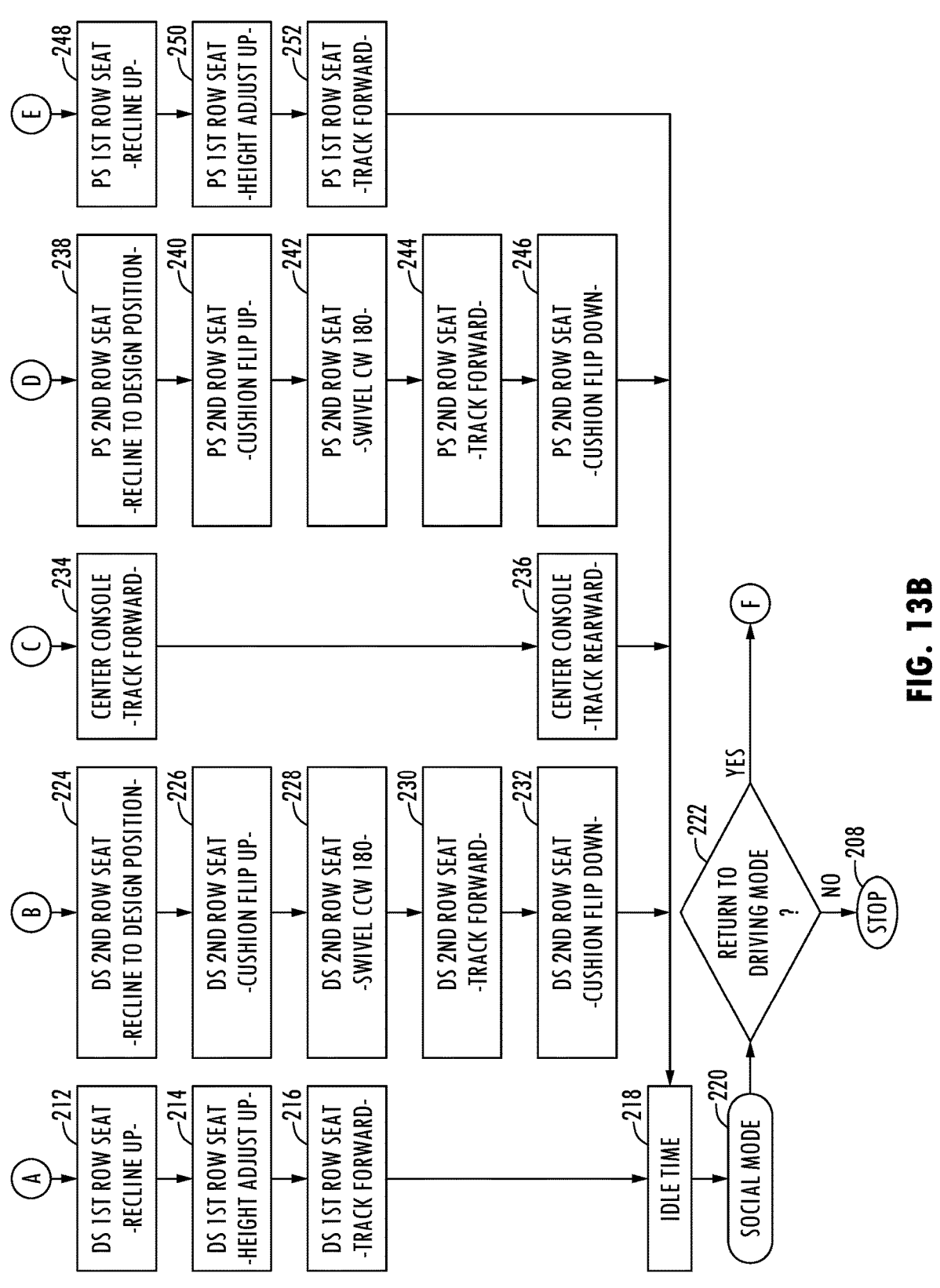
Figure 13C:
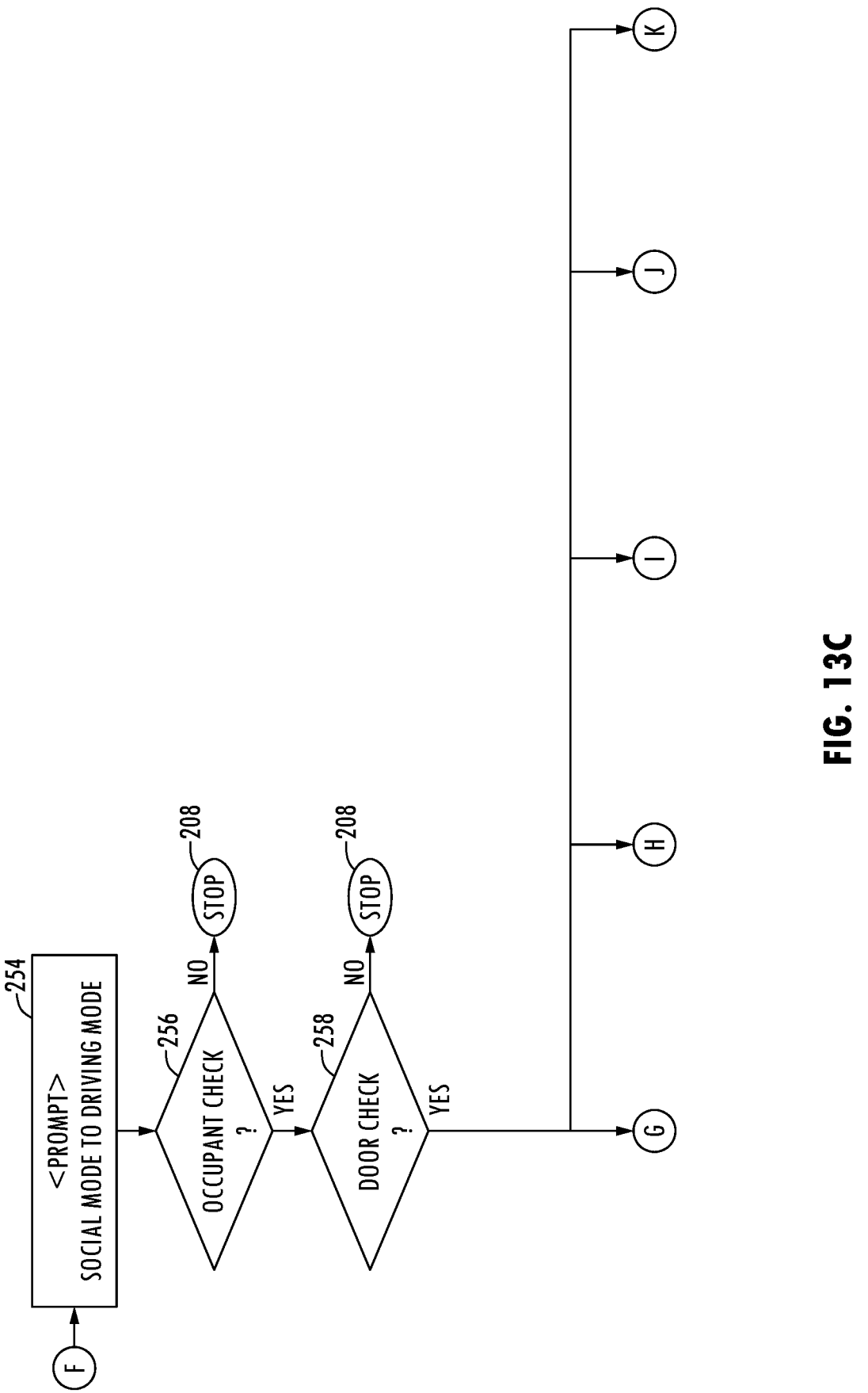
Figure 13D:
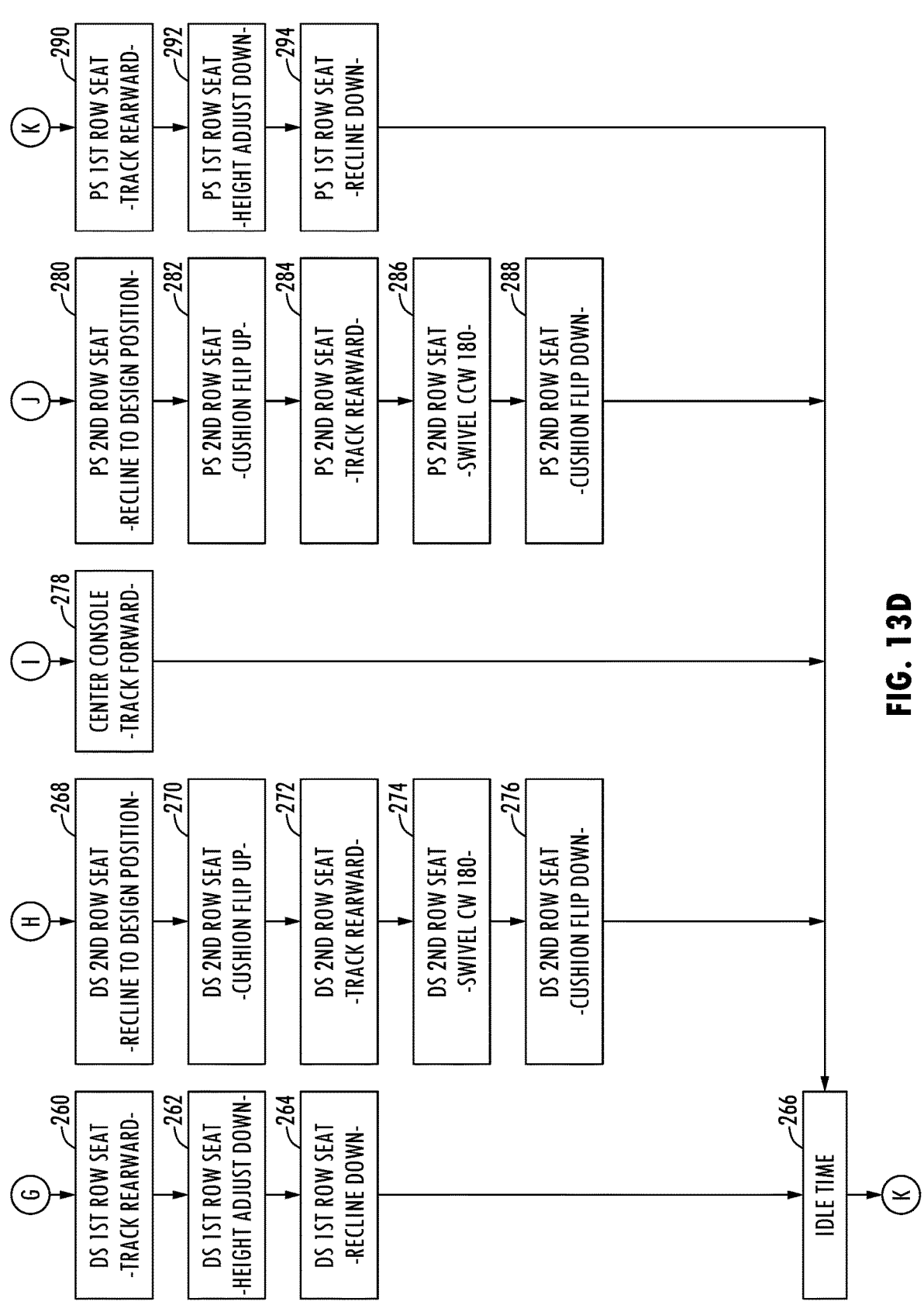

Referring to FIG. 13A, a control routine 200 is illustrated for transitioning the vehicle passenger compartment from the driving mode to the social mode, according to one example. Routine 200 begins at step 202 in the driving mode and proceeds to step 204 to receive a user input prompt to transition from the driving mode to the social mode. Routine 200 will then proceed to decision step 106 to perform an occupant detection check and to verify there are no obstructions. It should be appreciated that an interior camera and other sensors may be used to detect an obstruction in the movement path of the seating assemblies, and the center console may use the sensed signals to allow the transitions to occur only when there are no obstructions in the movement path. If occupants are detected seated in the vehicle, routine 200 will stop at step 208. If no occupants are detected in the vehicle, routine 200 will proceed to perform a door check to check if any doors are open. If any doors are detected open, routine 200 will stop at step 208. If all of the doors are closed, routine 200 proceeds to each of step 212, step 224, step 234, step 238 and step 248.

At step 212, routine 200 commands the driver's side first row seat to recline forward to an upward position. Next, at step 214, the driver's side first row seat is adjusted upward in height. At step 216, the driver's side first row seat is moved vehicle forward on the track. Thereafter, routine 200 proceeds to wait for an idle time to expire at step 218 before entering completion of the social mode at step 220.

At step 224, the driver's side second row seat is commanded to move from the recline position to the design position. Next, at step 226, the driver's side second row seat is commanded to flip up the cushion to the upright position. The driver's side second row seat is then rotated to swivel counterclockwise about a vertical axis by one hundred eighty degrees (180°) in step 228. In step 230, the driver's side second row seat is commanded to move vehicle forward on the track. At step 232, the driver's side second row seat is commanded to flip the cushion down to the use position. Thereafter, routine 200 will wait for the idle time to expire at step 218 before entering completion of the social mode at step 220.

At step 234, the center console is commanded to move vehicle forward on the track. Next, at step 236, the center console is moved vehicle rearward on the track. Thereafter, routine 200 proceeds to wait for the idle time to expire at step 218 before entering completion to the social mode at step 220.

At step 238, the passenger side second row seat is commanded to move from the recline position to the design position. Next, at step 240, the passenger side second row seat is commanded to flip up the cushion to the upright position. Next, at step 242, the passenger side second row seat is commanded to rotate to swivel clockwise about a vertical axis by one hundred eighty degrees (180°) to face vehicle backwards. In step 244, the passenger side second row seat is commanded to move vehicle forward on the track. At step 246, the passenger side second row seat cushion is commanded to be flipped down to the use position. Thereafter, routine 200 proceeds to wait for the idle time to expire at step 218 before entering completion of the social mode at step 220.

At step 248, the passenger side first row seat is commanded to recline forward and upward to an upright position. At step 250, the passenger side first row seat is adjusted in height upwards. Next, at step 256, the passenger side first row seat is commanded to move forward on the track. Thereafter, routine 200 waits for the idle time to expire at step 218 before entering the social mode at step 220.

In the social mode at step 220, routine 200 proceeds to decision step 222 to determine if the vehicle is to return to the driving mode and, if not, stops at step 208. If it is determined that the vehicle is to return to the driving mode, routine 200 proceeds to step 254 to wait for a user input prompt to transition from the social mode to the driving mode. Once the user input prompt is received, routine 200 performs an occupant check at step 256. If occupants are detected in the vehicle, routine 200 stops at step 208. If no occupants are detected in the vehicle, routine 200 performs a door check at step 258. If a vehicle door is detected open, routine 200 stops at step 208. If no vehicle doors are detected open, routine 200 proceeds to each of step 260, step 268, step 278, step 280, and step 290.

At step 260, the driver's side first row seat is commanded to move vehicle rearward on the track. Next, at step 262, the driver's side first row seat is adjusted downward in height. At step 264, the driver's side first row seat is commanded to recline downward. Thereafter, routine 200 proceeds to wait for an idle time to expire at step 266 before returning to the driving mode at step 202.

At step 268, the driver's side second row seat is commanded to move from the recline position to the design position. At step 270, the driver's side second row seat is commanded to flip up the cushion to the upright position. At step 272, the driver's side second row seat is commanded to move vehicle rearward on the track. At step 274, the driver's side second row seat is commanded to rotate to swivel clockwise by one hundred eighty degrees (180°) to face vehicle forward. At step 276, the driver's side second row seat is commanded to flip down the cushion. Thereafter, routine 200 waits for the idle time to expire at step 266 before returning to the driving mode at step 202.

At step 278, the center console is commanded to move vehicle forward on the track. Thereafter, routine 200 waits for the idle time to expire at step 266 before returning to the driving mode at step 202.

At step 280, the passenger side second row seat is commanded to move from the recline position to the design position. Next, at step 282, the passenger side second row seat is commanded to flip up the seat cushion to the upright position. At step 284, the passenger seat second row seat is commanded to move rearward on the track. At step 286, the passenger side second row seat is commanded to rotate to swivel counterclockwise one hundred eighty degrees (180°) to face vehicle forward. At step 288, the passenger side second row seat is commanded to flip down the seat cushion. Therefore, routine 200 proceeds to wait for the idle time to expire at step 266 before returning to the driving mode at step 202.

At step 290, the passenger side first row seat is commanded to move vehicle rearward on the track. Next, at step 292, the passenger side first row seat is commanded to adjust downward in height. At step 294, the passenger side first row seat is commanded to recline downward. Thereafter, routine 200 waits for the idle time to expire at step 266 before returning to the driving mode at step 202.

Following expiration of the idle time at step 266, routine 200 returns to step 202 with the vehicle passenger compartment arranged in the driving mode.

Figure 14A:
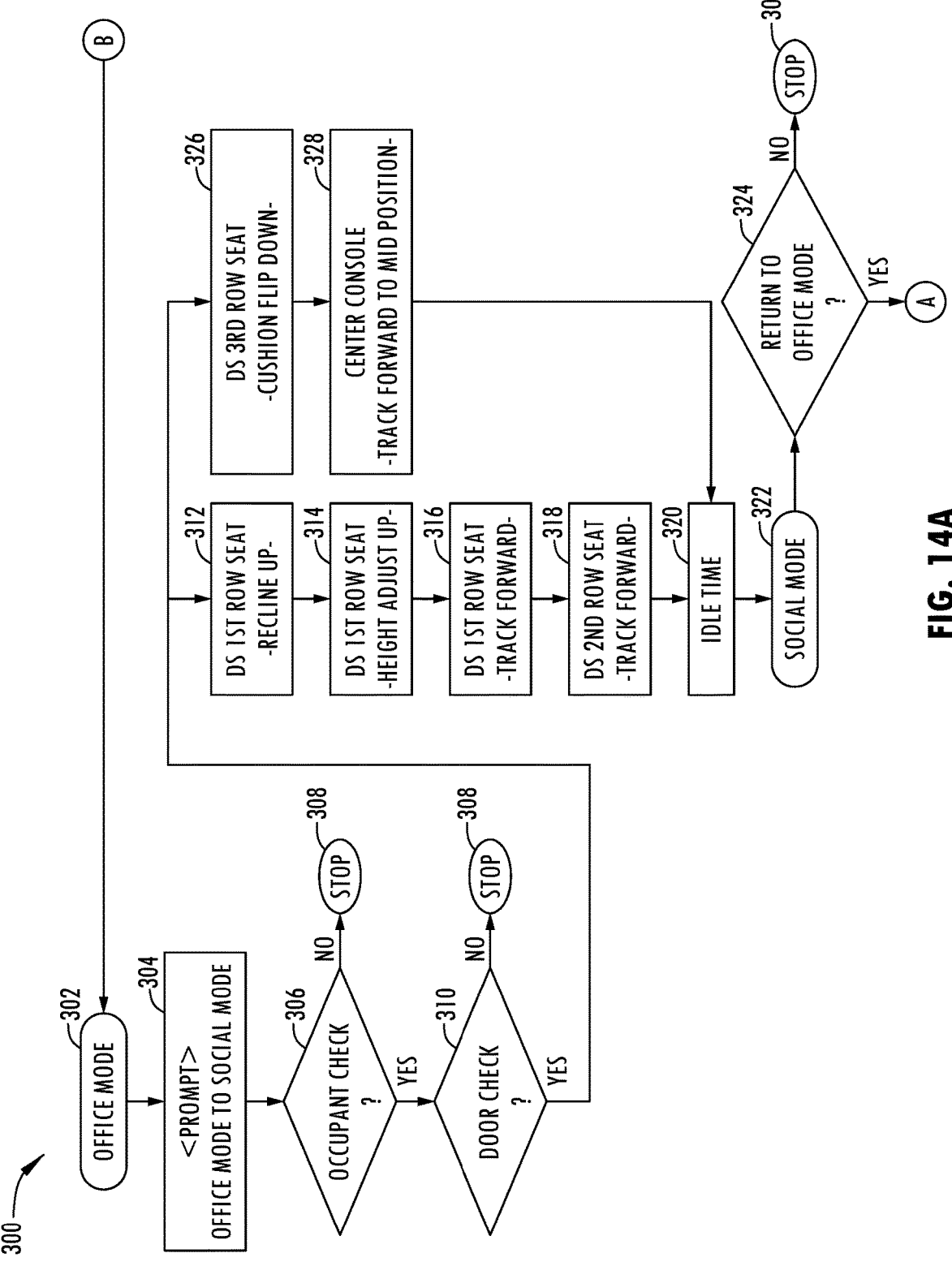
FIGS. 14A-14B are a flow diagram illustrating a routine for transitioning the passenger compartment from the driving mode to the social mode, according to one example.
Figure 14B:
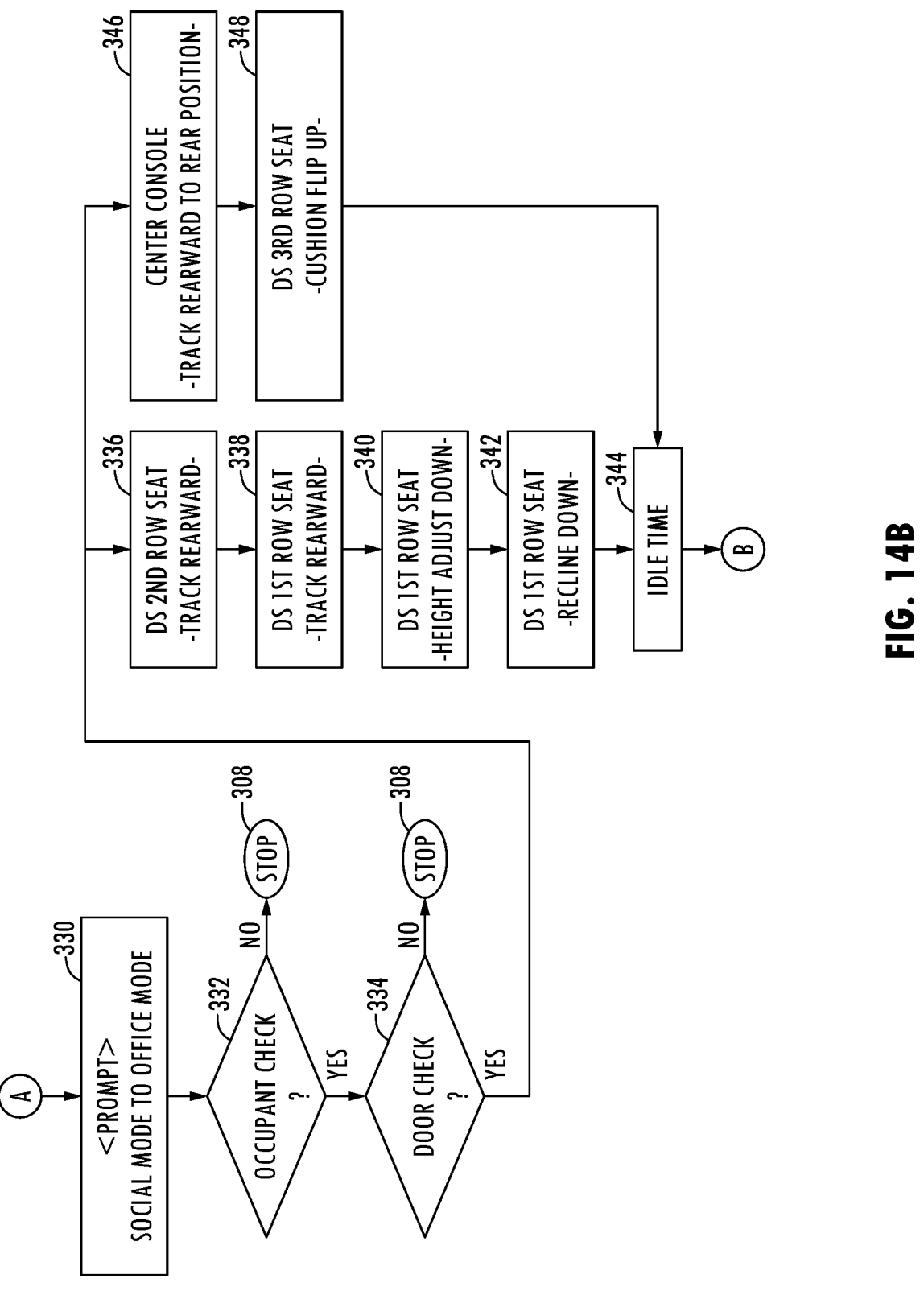

Referring to FIGS. 14A and 14B, a control routine 300 is illustrated for transitioning the vehicle passenger compartment from an office mode to a social mode, according to one example. Routine 300 begins at step 302 in the office mode and proceeds to step 304 to receive a user prompt to transition from the office mode to the social mode. Routine 300 then proceeds to decision step 306 to perform an occupant check. If one or more occupants are detected seated in the vehicle, routine 300 proceeds to stop at step 308. If no occupants are in the vehicle, routine 300 proceeds to perform a door check at step 310. If any vehicle doors are detected open, routine 300 stops at step 308. If no doors are detected open, routine 300 proceeds to each of step 312 and step 326.

At step 312, the driver's side first row seat is commanded to recline upward. Next, at step 314, the driver's side first row seat is commanded to adjust upward in height. At step 316, the driver's side first row seat is commanded to move vehicle forward on the track. At step 318, the driver's side second row seat is commanded to move vehicle forward on the track. At step 320, routine 300 waits for an idle time to expire before completing the transition to the social mode at step 322.

At step 326, the driver's side third row seat is commanded to flip the seat cushion to the downward use position. Next, at step 328, the center console is commanded to move the vehicle forward to a mid-position on the track. Thereafter, routine 300 proceeds to wait for the idle time to expire in step 320 before transitioning to the social mode at step 322.

Once in the social mode, the routine 300 proceeds to decision step 324 to determine if the arrangement should return to the office mode and, if not, stops at step 308. If it is determined that the arrangement should return to the office mode, routine 300 proceeds to step 330 to receive a user input prompt to transition from the social mode to the office mode. Thereafter, routine 300 proceeds to perform an occupant check at step 332 to determine if one or more occupants are seated in the vehicle and that there are no obstructions detected with an interior camera. If any occupants are detected seated in the vehicle, routine 300 stops at step 308. If no occupants are detected in the vehicle, routine 300 performs at door check at step 334. If any doors are detected open, routine 300 stops at step 308. If no doors are detected open, routine 300 proceeds to each of step 336 and step 346.

At step 336, the driver's side second row seat is commanded to move vehicle rearward on the track. Next, at step 338, the driver's side first row seat is commanded to move rearward on the track. At step 340, the driver's side first row seat is commanded to adjust downward in height. At step 342, the driver's side first row seat is commanded to recline downward. At step 344, routine 300 waits for the idle time to expire before completing the transition to the office mode at step 302.

At step 346, the center counsel is commanded to move vehicle rearward on the track to the rear position. Next, at step 348, the driver's side third row seat cushion is commanded to flip up to an upright position. Thereafter, routine 300 waits for the idle time to expire at step 344 before completing the transition to the office mode at step 302.

Figure 15:
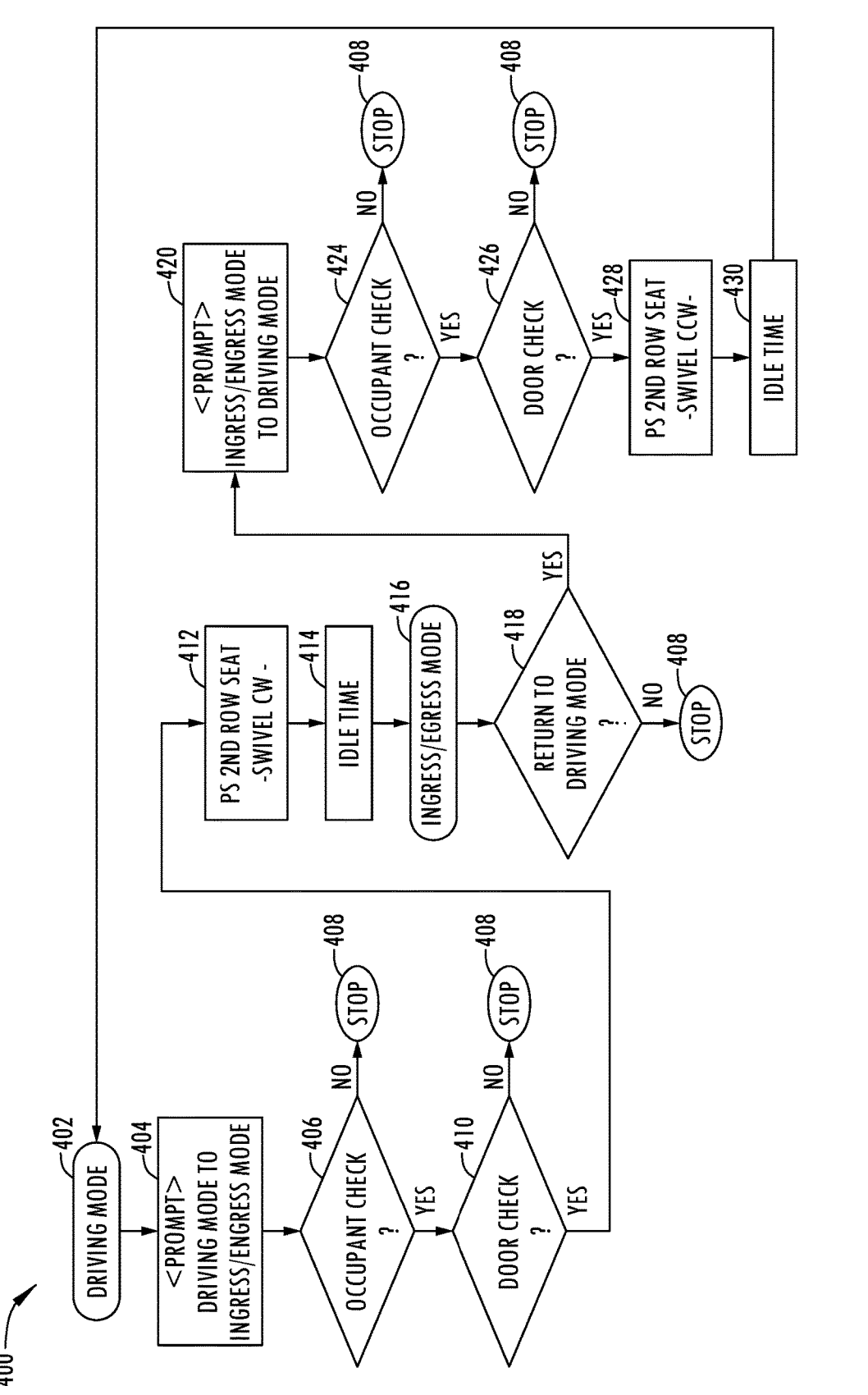
FIG. 15 is a flow diagram illustrating a routine for transitioning the passenger compartment from the driving mode to the child load mode, according to one example.

Referring to FIG. 15, a control routine 400 is illustrated for transitioning the vehicle passenger compartment from a driving mode to an ingress/egress mode, according to one example. Routine 400 begins at step 402 in the driving mode and proceeds to step 404 to receive a user input prompt to transition from the driving mode to the ingress/egress mode. Routine 400 will then proceed to decision step 406 to perform an occupant check. If one or more occupants are detected seated in the vehicle, routine 400 will stop at step 408. If there are no occupants detected in the vehicle, routine 400 proceeds to decision step 410 to perform a door check. If any doors are detected open, routine 400 stops at step 408. If there are no doors detected open, routine 400 proceeds to step 412.

At step 412, the passenger side second row seat is rotated to swivel about a vertical axis clockwise one hundred eighty degrees (180°) to a vehicle rearward facing position. Next, at step 414, routine 400 waits for an idle time to expire. Following expiration of the idle time, routine 400 proceeds to step 416 to complete the transition to the ingress/egress mode.

Once in the ingress/egress mode, routine 400 proceeds to decision step 418 to determine if the vehicle is to return to the driving mode and, if not, stops at step 408. If it is determined that the vehicle is to return to the driving mode, routine 400 proceeds to step 420 to receive a user input prompt to transition from the ingress/egress mode to the driving mode. Once the user input prompt is received, routine 400 proceeds to perform an occupant check at step 424. If one or more occupants are detected in the vehicle, routine 400 proceeds to step 408 to stop. If there are no occupants detected in the vehicle, routine 400 proceeds to decision step 426 to perform a door check. If any doors are detected open, routine 400 stops at step 408. If there are no doors detected open, routine 400 proceeds to step 428 where the passenger side second row seat is commanded to rotate to swivel counterclockwise one hundred eighty degrees (180°) to face vehicle forward. Thereafter, routine 400 waits for an idle time to expire at step 430 before transitioning completely to the driving mode.

It should be appreciated that the motor vehicle 10 may include additional control routines stored in memory 84 and executed by the microprocessor 82 to perform passenger compartment transitions from one mode to another mode. For example, the motor vehicle 10 may be configured to transition from the driving mode to the child load mode whereby the passenger side or driver's side second row seat is commanded to rotate to swivel ninety degrees (90°) from the driving mode passenger configuration to the child load passenger configuration to present the seat for loading a child thereon. The child load mode may transition back to the driving mode by reversing the process and rotating the second row seat ninety degrees (90°) in the opposite direction to face vehicle forward.

Similarly, the passenger compartment of the motor vehicle 10 may be equipped with a control routine to transition from the driving mode to the cargo mode. This may include flipping the seat bases upward on the third row seats and the second row seats and sliding the second row seats vehicle rearward proximate to the front side of the rear row seats, to present a cargo load area between the first and second rows of seats. This process may be reversed by moving the second row seats vehicle forward and flipping down the seat bases on the second and third rows to return the passenger compartment to the driving mode. It should be appreciated that other types of transitions of the passenger compartment between the various modes provided herein may transition from one mode to another by controlling the one or more actuators to move the seats and the center console amongst the various positions.

Accordingly, a motor vehicle 10 in the form of a three-row seating pickup truck is provided having six doors and a convertible passenger compartment 14 with a seating and center console arrangement that may be configured to transition to any of a plurality of passenger compartment arrangements. A user may simply initiate the transition to a passenger compartment mode on an input device, such as on a phone, a key fob, a touchscreen display, an audio input, or other inputs, to change the seating and center console configurations to accommodate a selected passenger compartment arrangement.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:
1. A motor vehicle comprising:
a passenger compartment having a forward region, a central region, and a rearward region;
a floor;
a seating rail system positioned on the floor and extending along a longitudinal direction of the motor vehicle;

a plurality of seating assemblies arranged in the passenger compartment in a first row, a second row, and a third row, each of the seating assemblies comprising:

a seat base coupled to the seating rail system;

a seat movably coupled to the seat base;

a seat back movably coupled to the seat base; and one or more seat actuators configured to actuate the seating assemblies to a plurality of positions;

three side doors on each of the opposite lateral sides of the vehicle for accessing the three rows of seating;

a center console rail system;

a center console positioned on the center console rail system extending longitudinally on the floor;

a center console actuator to actuate the center console on the center console rail system; and a controller configured to receive an input commanding a selected passenger compartment arrangement, wherein the controller controls the one or more seat actuators and the center console actuator to position the seat assemblies and the center console in the commanded passenger compartment arrangement.

2. The vehicle of claim 1, further comprising a user input device for inputting selection of the user input.

3. The vehicle of claim 2, wherein the user input device comprises one of a phone, a key fob, a microphone, a gesture detecting device, and a touchscreen display.

4. The vehicle of claim 1, wherein the selected seating arrangement includes one of a driving mode, a social mode, and a cargo mode.

5. The vehicle of claim 4, wherein the selected passenger compartment arrangement further includes an office mode and a child seat mode with at least one of the seat assemblies facing one of the side doors.

6. The vehicle of claim 1, wherein the seating assemblies in the second row seating further comprise a swivel actuator for rotating the seats about a vertical axis.

7. The vehicle of claim 1, wherein the third row seating comprises a seat back adjacent to a rear wall of the passenger compartment.

8. The vehicle of claim 1, wherein the forward region includes the first row, the central region includes the second row, and the rearward region includes the third row in a driving mode.

9. The vehicle of claim 8, wherein the vehicle comprises a pickup truck.

10. A motor vehicle configured as a pickup truck, the motor vehicle comprising:

a passenger compartment having a forward region, a central region, and a rearward region;

a floor;

a seating rail system positioned on the floor and extending along a longitudinal direction of the motor vehicle;

a plurality of seating assemblies arranged in the passenger compartment in a first row, a second row, and a third row, each of the seating assemblies comprising:

a seat base coupled to the seating rail system;

a seat movably coupled to the seat base;

a seat back movably coupled to the seat base; and one or more seat actuators configured to actuate the seating assemblies to a plurality of positions;

three side doors on each of the opposite lateral sides of the vehicle for accessing the three rows of seating;

a center console rail system;

a center console positioned on the center console rail system extending longitudinally on the floor;

a center console actuator to actuate the center console on the center console rail system; and a controller configured to receive an input commanding a selected passenger compartment arrangement, wherein the controller controls the one or more seat actuators and the center console actuator to position the seat assemblies and the center console in the commanded passenger compartment arrangement.

11. The vehicle of claim 10, further comprising a user input device for inputting selection of the user input.

12. The vehicle of claim 11, wherein the user input device comprises one of a phone, a key fob, a microphone, a gesture detecting device, and a touchscreen display.

13. The vehicle of claim 10, wherein the selected seating arrangement includes one of a driving mode, a social mode, and a cargo mode.

14. The vehicle of claim 13, wherein the selected passenger compartment arrangement further includes an office mode and a child seat mode with at least one of the seat assemblies facing one of the side doors.

15. The vehicle of claim 10, wherein the seating assemblies in the second row seating further comprise a swivel actuator for rotating the seats about a vertical axis.

16. The vehicle of claim 10, wherein the third row seating comprises a seat back adjacent to a rear wall of the cab.

17. The vehicle of claim 10, wherein the selected passenger compartment arrangement includes a child's seat mode in which at least one of the seating assemblies faces one of the side doors.

18. The vehicle of claim 1, wherein the selected passenger compartment arrangement includes a child's seat mode in which at least one of the seating assemblies faces one of the side doors.

* * * * *